US012750093B2

(12) United States Patent
Nakano et al.

(10) Patent No.: US 12,750,093 B2
(45) Date of Patent: Sep. 29, 2026

(54) COMMUNICATION DEVICE AND COMMUNICATION METHOD

(71) Applicant: Panasonic Intellectual Property Corporation of America, Torrance, CA (US)

(72) Inventors: Takayuki Nakano, Ishikawa (JP); Yoshio Urabe, Nara (JP); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 28 days.

(21) Appl. No.: 18/836,663

(22) PCT Filed: Jan. 20, 2023

(86) PCT No.: PCT/JP2023/001721
§ 371 (c)(1),
(2) Date: Aug. 7, 2024

(87) PCT Pub. No.: WO2023/153176
PCT Pub. Date: Aug. 17, 2023

(65) Prior Publication Data

US 2025/0112670 A1 Apr. 3, 2025

(30) Foreign Application Priority Data

Feb. 10, 2022 (JP) ................................ 2022-019611

(51) Int. Cl.
*H04B 7/024* (2017.01)
*H04L 1/00* (2006.01)
*H04L 1/1607* (2023.01)

(52) U.S. Cl.
CPC ........... *H04B 7/024* (2013.01); *H04L 1/0025* (2013.01); *H04L 1/0073* (2013.01); *H04L 1/1671* (2013.01)

(58) Field of Classification Search
CPC .......... H04B 7/02; H04B 7/022; H04B 7/024; H04B 7/026; H04L 1/0001; H04L 1/0023;
(Continued)

(56) References Cited

U.S. PATENT DOCUMENTS 9,526,094 B2 * 12/2016 Hoshino ............. H04L 25/0204
12,273,297 B2 * 4/2025 Matsuo .................. H04B 7/024
(Continued)

FOREIGN PATENT DOCUMENTS

WO 2021/039428 A1 3/2021

OTHER PUBLICATIONS

Au, Edward "Compendium of straw polls and potential changes to the Specification Framework Document Part 2," doc.: IEEE 802. 11-20/1935r55, Huawei, Jan. 14, 2022, 392 pages.
(Continued)

*Primary Examiner* — James M Perez
(74) *Attorney, Agent, or Firm* — Seed Intellectual Property Law Group LLP

(57) ABSTRACT

This communication device comprises: a control circuit that measures signals received from a plurality of other communication devices to determine measurement values, and that generates, on the basis of the measurement values, feedback information relating to switching of cooperative communication; and a transmission circuit that transmits the feedback information.

16 Claims, 21 Drawing Sheets

(58) Field of Classification Search
CPC ... H04L 1/0025; H04L 1/0026; H04L 1/0027; H04L 1/004; H04L 1/0072; H04L 1/0073; H04L 1/12; H04L 1/16; H04L 1/1607; H04L 1/1671
See application file for complete search history.

(56) References Cited

U.S. PATENT DOCUMENTS

| | | | | |
|---|---|---|---|---|
| 12,294,542 | B2 * | 5/2025 | Nakano | H04L 27/2613 |
| 12,323,820 | B2 * | 6/2025 | Watanabe | H04B 17/345 |
| 12,457,643 | B2 * | 10/2025 | Wang | H04L 5/0035 |
| 2011/0299484 | A1 * | 12/2011 | Nam | H04L 1/0073 370/329 |
| 2012/0281556 | A1 * | 11/2012 | Sayana | H04L 5/0057 370/252 |
| 2013/0017825 | A1 * | 1/2013 | Li | H04L 1/0029 455/425 |
| 2013/0044697 | A1 * | 2/2013 | Yoo | H04W 72/541 370/328 |
| 2014/0105200 | A1 * | 4/2014 | Seok | H04L 5/005 370/338 |
| 2015/0173064 | A1 * | 6/2015 | Kim | H04B 17/00 370/252 |
| 2016/0211954 | A1 * | 7/2016 | Göransson | H04W 52/244 |
| 2019/0281587 | A1 * | 9/2019 | Zhang | H04W 72/23 |
| 2020/0112420 | A1 * | 4/2020 | Xu | H04L 5/0073 |
| 2021/0044333 | A1 * | 2/2021 | Jiang | H04B 7/0619 |
| 2021/0067214 | A1 * | 3/2021 | Vermani | H04B 7/0691 |
| 2021/0120427 | A1 | 4/2021 | Wang et al. | |
| 2021/0143884 | A1 * | 5/2021 | Kwon | H04W 74/0816 |
| 2021/0152396 | A1 * | 5/2021 | Cherian | H04B 7/0452 |
| 2021/0307099 | A1 * | 9/2021 | Ryu | H04W 76/15 |
| 2021/0385779 | A1 * | 12/2021 | Oteri | H04W 60/04 |
| 2022/0030611 | A1 * | 1/2022 | Oteri | H04W 72/20 |
| 2022/0132326 | A1 * | 4/2022 | Wang | H04W 72/1268 |
| 2022/0140879 | A1 * | 5/2022 | Liang | H04B 7/0626 375/267 |
| 2022/0182273 | A1 * | 6/2022 | Huang | H04L 5/0053 |
| 2022/0352930 | A1 * | 11/2022 | Kanaya | H04B 7/024 |
| 2023/0102611 | A1 * | 3/2023 | Suh | H04L 5/0053 370/328 |
| 2023/0139852 | A1 * | 5/2023 | Kanaya | H04L 5/0053 370/329 |
| 2023/0371026 | A1 * | 11/2023 | Nakano | H04B 7/024 |
| 2023/0388920 | A1 * | 11/2023 | Solaija | H04W 40/12 |
| 2023/0422179 | A1 * | 12/2023 | Kanaya | H04W 52/146 |
| 2024/0098712 | A1 * | 3/2024 | Chitrakar | H04L 5/0035 |
| 2024/0155407 | A1 * | 5/2024 | Nakano | H04B 7/024 |
| 2024/0223250 | A1 * | 7/2024 | Saad | H04B 7/0626 |
| 2024/0243862 | A1 * | 7/2024 | Saad | H04L 5/0033 |
| 2024/0267176 | A1 * | 8/2024 | Kim | H04L 5/0044 |
| 2024/0334250 | A1 * | 10/2024 | Kanaya | H04W 24/02 |
| 2024/0414596 | A1 * | 12/2024 | Minotani | H04W 72/0453 |
| 2025/0024454 | A1 * | 1/2025 | Nakano | H04W 16/02 |
| 2025/0112670 | A1 * | 4/2025 | Nakano | H04L 1/1671 |
| 2025/0151083 | A1 * | 5/2025 | Handte | H04B 7/024 |
| 2025/0219679 | A1 * | 7/2025 | Kanaya | H04B 7/024 |
| 2025/0240055 | A1 * | 7/2025 | Aio | H04L 5/0048 |

OTHER PUBLICATIONS

International Search Report, mailed Mar. 7, 2023, for International Application No. PCT/JP2023/001721, 4 pages. (With English Translation).

Yang et al., "On Joint C-SR and C-OFDMA M-AP Transmission," doc.: IEEE 802.11-20/1399r2, InterDigital, Inc., Sep. 3, 2020, 10 pages.

Indian Office Action, dated Aug. 6, 2026, for Indian Application No. 202417058902. (7 pages).

* cited by examiner

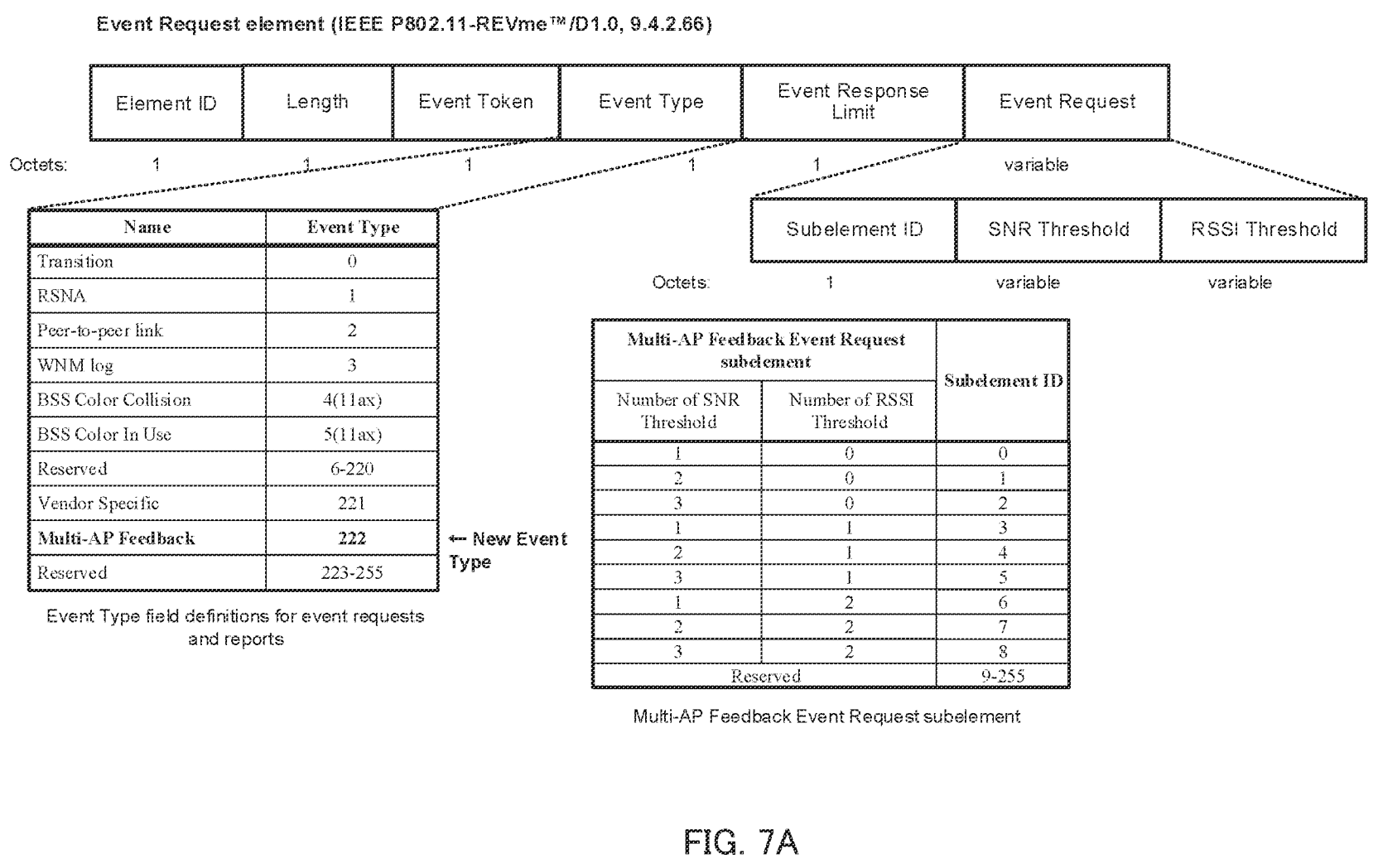

Event Request element (IEEE P802.11-REVme™/D1.0, 9.4.2.66)

| | Element ID | Length | Event Token | Event Type | Event Response Limit | Event Request |
|---|---|---|---|---|---|---|
| Octets: | 1 | 1 | 1 | 1 | 1 | variable |

| Name | Event Type |
|---|---|
| Transition | 0 |
| RSNA | 1 |
| Peer-to-peer link | 2 |
| WNM log | 3 |
| BSS Color Collision | 4(11ax) |
| BSS Color In Use | 5(11ax) |
| Reserved | 6-220 |
| Vendor Specific | 221 |
| **Multi-AP Feedback** | **222** |
| Reserved | 223-255 |

← New Event Type

Event Type field definitions for event requests and reports

| | Subelement ID | SNR Threshold | RSSI Threshold |
|---|---|---|---|
| Octets: | 1 | variable | variable |

| **Multi-AP Feedback Event Request subelement** | | **Subelement ID** |
|---|---|---|
| Number of SNR Threshold | Number of RSSI Threshold | |
| 1 | 0 | 0 |
| 2 | 0 | 1 |
| 3 | 0 | 2 |
| 1 | 1 | 3 |
| 2 | 1 | 4 |
| 3 | 1 | 5 |
| 1 | 2 | 6 |
| 2 | 2 | 7 |
| 3 | 2 | 8 |
| Reserved | | 9-255 |

Multi-AP Feedback Event Request subelement

FIG. 7A

= Multi-AP Feedback (222)

Event Report element (IEEE P802.11-REVme™/D1.0, 9.4.2.67)

| | Element ID | Length | Event Token | Event Type | Event Report Status |
|---|---|---|---|---|---|
| Octets: | 1 | 1 | 1 | 1 | 1 |

| | Event TSF (optional) | UTC Offset (optional) | Event Time Error (optional) | Event Report (optional) |
|---|---|---|---|---|
| Octets: | 0 or 8 | 0 or 10 | 0 or 5 | variable |

| | Subelement ID | Indicators that the threshold is exceeded |
|---|---|---|
| Octets: | 1 | variable |

| Multi-AP Feedback Event Request subelement | | Number of Indicators that the threshold is exceeded | Subelement ID |
|---|---|---|---|
| Number of SNR Threshold | Number of RSSI Threshold | | |
| 1 | 0 | 1 | 0 |
| 2 | 0 | 2 | 1 |
| 3 | 0 | 3 | 2 |
| 1 | 1 | 2 | 3 |
| 2 | 1 | 3 | 4 |
| 3 | 1 | 4 | 5 |
| 1 | 2 | 3 | 6 |
| 2 | 2 | 4 | 7 |
| 3 | 2 | 5 | 8 |
| Reserved | | | 9-255 |

Multi-AP Feedback Event Request subelement ID and Number of Indicators that the threshold is exceeded

FIG. 8

| Code | Meaning |
|---|---|
| ... | ... |
| 32(11ba) | WUR |
| **33** | **MAP** |
| 34–125 | Reserved |
| ... | ... |

| MAP Action field value | Description |
|---|---|
| 0 | MAP Setup |
| 1 | MAP Events Request |
| 2 | MAP Events Report |
| 3–255 | Reserved |

| Multi-AP Feedback Event Request subelement | | Number of Indicators that the threshold is exceeded | Subelement ID |
|---|---|---|---|
| Number of SNR Threshold | Number of RSSI Threshold | | |
| 1 | 0 | 1 | 0 |
| 2 | 0 | 2 | 1 |
| 3 | 0 | 3 | 2 |
| 1 | 1 | 2 | 3 |
| 2 | 1 | 3 | 4 |
| 3 | 1 | 4 | 5 |
| 1 | 2 | 3 | 6 |
| 2 | 2 | 4 | 7 |
| 3 | 2 | 5 | 8 |
| Reserved | | | 9-255 |

| Multi-AP coordination schemes | FEEDBACK INFORMATION |
|---|---|
| C-SR | RSSI |
| C-OFDMA | NONE |
| C-BF, JT | RSSI, CSI |

FIG. 13

| Trigger Type subfield value | Trigger frame variant |
|---|---|
| 0 | Basic |
| 1 | Beamforming Report Poll (BFRP) |
| ... | ... |
| 7 | NDP Feedback Report Poll (NFRP) |
| 8 | MAP coordination scheme SWITCHING REQUEST COLLECTION |
| 9 | NDP sounding REQUEST COLLECTION |
| ... | ... |

COMMUNICATION DEVICE AND COMMUNICATION METHOD

TECHNICAL FIELD

The present disclosure relates to a communication apparatus and a communication method.

BACKGROUND ART

In the Institute of Electrical and Electronics Engineers (IEEE), studies have been carried out on the IEEE 802.11be standard (hereinafter, also referred to as "12be") for the next generation radio Local Area Network (LAN), which is the successor to the IEEE 802.11ax standard (hereinafter, also referred to as "11ax"). For example, the IEEE 802.11ax is also referred to as High Efficiency (HE), and the IEEE 802.12be is also referred to as Extremely High Throughput (EHT).

CITATION LIST

Non-Patent Literature

NPL 1
IEEE 802.11-20/1935r55, Compendium of straw polls and potential changes to the Specification Framework Document—Part 2
NPL 2
IEEE 802.11-20/1399r2, On Joint C-SR and C-OFDMA M-AP Transmission

SUMMARY OF INVENTION

However, in coordinated communication applied to radio communication such as wireless LAN, an amount of information to be fed back by one communication apparatus to another communication apparatus possibly increases.

A non-limiting embodiment of the present disclosure facilitates providing a communication apparatus and a communication method each capable of reducing an amount of information to be fed back in coordinated communication.

A communication apparatus according to an embodiment of the present disclosure includes: control circuitry, which, in operation, determines a measurement value by measuring signals received from a plurality of other communication apparatuses, and generates feedback information on switching of coordinated communication based on the measurement value; and transmission circuitry, which, in operation, transmits the feedback information.

It should be noted that general or specific embodiments may be implemented as a system, an apparatus, a method, an integrated circuit, a computer program, a storage medium, or any selective combination thereof.

According to an embodiment of the present disclosure, it is possible to reduce the amount of information to be fed back in coordinated communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7A illustrates an exemplary Event Request element;

FIG. 8 illustrates an exemplary Event Report element;

FIG. 13 illustrates feedback information for each MAP coordination scheme;

DESCRIPTION OF EMBODIMENTS

Hereinafter, embodiments of the present disclosure will be described in detail with reference to the accompanying drawings.

[Multi-Access Point Coordination]

In 11be, discussion has been made for the application of Multi-AP (hereinafter, referred to as "MAP") coordination (hereinafter, referred to as "coordinated communication" or "inter-base-station coordinated communication"), in which a plurality of access points (AP: Access Point, or also referred to as a "base station") is cooperatively transmit and receive data to and from each terminal (STA: station, or also referred to as "non-AP STA").

For coordinated communication in 11be, a plurality of Multi-AP coordination schemes (MAP coordination schemes) is studied. For example, the following schemes are studied.

- Coordinated Spatial Reuse (hereinafter, sometimes referred to as "C-SR")
- Coordinated OFDMA (hereinafter, sometimes referred to as "C-OFDMA")

Coordinated Beamforming (hereinafter, sometimes referred to as "CBF")

Joint Transmissions (hereinafter, sometimes referred to as "JT")

Note that, in an embodiment of the present disclosure, JT includes a method by which a plurality of coordinating APs transmits the same signal to each other and a method by which a plurality of coordinating APs transmits different transmission streams to each other. The method by which a plurality of coordinating APs transmits different transmission streams to each other is sometimes referred to as, for example, Distributed MU-MIMO (hereinafter, sometimes referred to as "D-MIMO").

Note that JT is sometimes defined as a method by which a plurality of coordinating APs transmits the same signal to each other, and D-MIMO and JT are defined as different schemes.

Note that the term, MAP coordination schemes, may be replaced with another term such as "communication types" or "MAP types," for example.

The MAP coordination schemes may be used in combination. For example, Non-Patent Literature (hereinafter, referred to as NPL) 2 describes that combining C-SR, C-OFDMA, and the like together improves system throughput and frequency utilization efficiency.

However, in MAP transmission, measurement information between a plurality of Nodes (e.g., AP and/or STA) is fed back, so that the information amount of feedback possibly increases.

In the present embodiment, an event of switching MAP coordination schemes is reported based on the measurement values of a plurality of Nodes. Note that the report of the event of switching MAP coordination schemes is sometimes referred to as "MAP coordination scheme switching event report."

Figure 1:
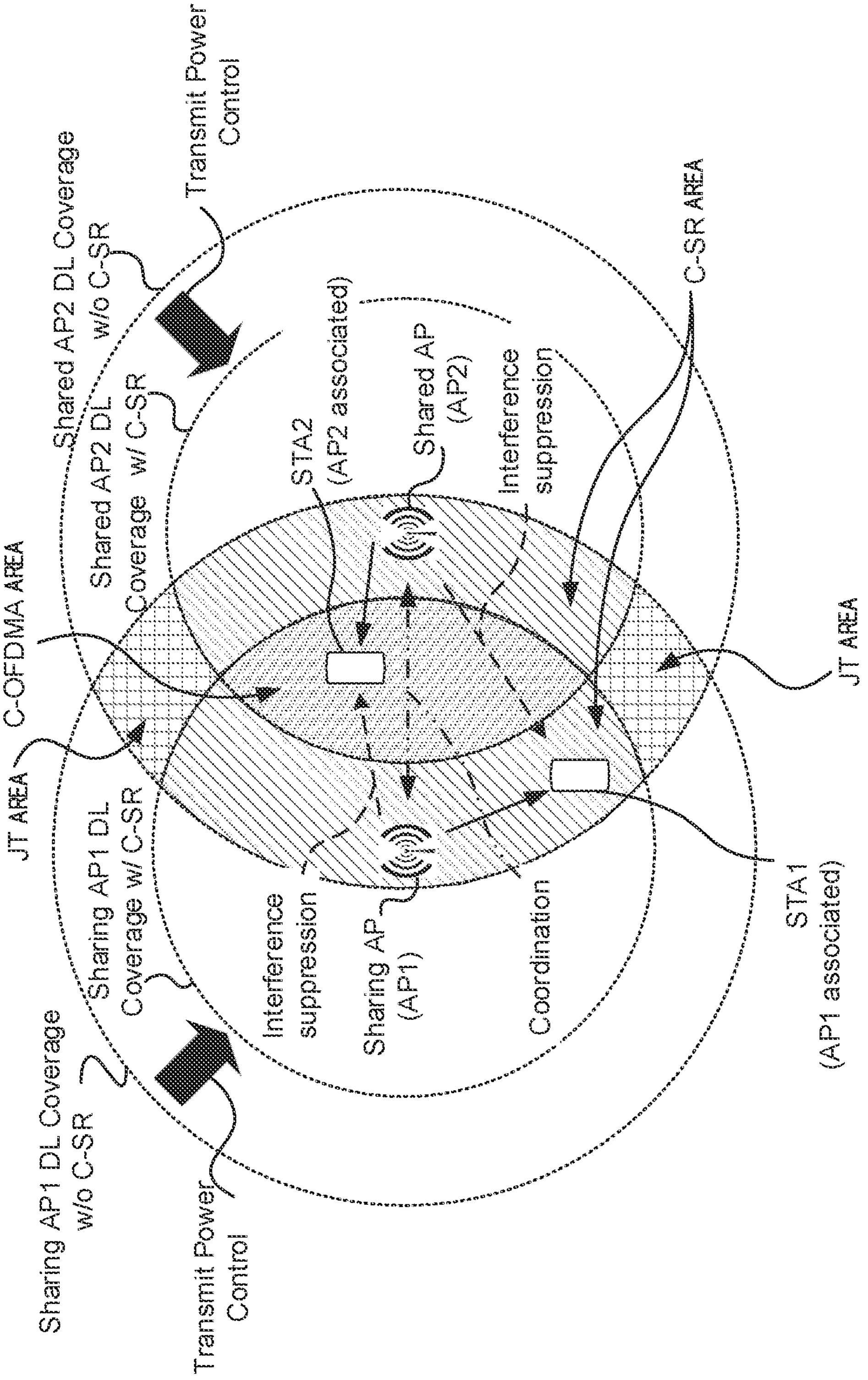
FIG. 1 illustrates exemplary differentiation between MAP coordination schemes.

FIG. 1 illustrates exemplary differentiation between MAP coordination schemes. FIG. 1 illustrates an exemplary relation between areas where STAs are located and MAP coordination schemes applied to coordinated communication when Sharing AP and Shared AP coordinate with each other to communicate with STAs (e.g., STA 1 and STA 2).

In FIG. 1, Sharing AP is an AP that obtains TXOP (transmission opportunity, channel use (transmission) duration) and initiates coordinated communication. Shared AP is an AP to which coordinated communication is indicated by the Sharing AP. In the example of FIG. 1, an exemplary configuration is described in which Shared AP also serves as Sharing AP, but Sharing AP may be provided separately from Shared AP. STA 1 is associated (connected) with Sharing AP (AP 1) and communicates with Sharing AP (AP 1). STA 2 is associated with Shared AP (AP 2) and communicates with Shared AP (AP 2).

In the example of FIG. 1, the differentiated MAP coordination schemes are three types of C-SR. C-OFDMA, and JT. Note that the differentiated MAP coordination schemes may correspond to switchable MAP coordination schemes.

Figure 2:
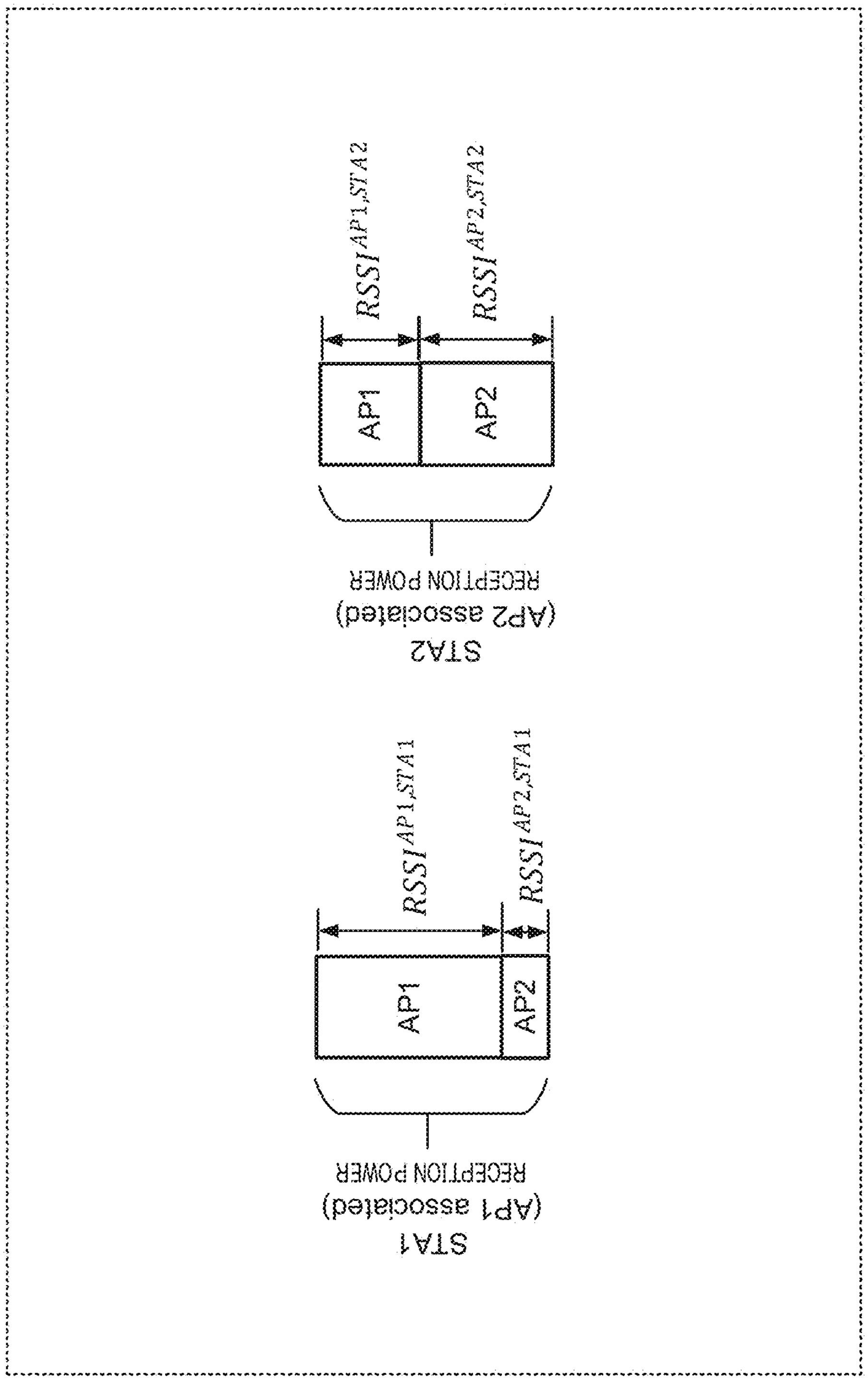
FIG. 2 illustrates exemplary reception power of each of STA1 and STA2 illustrated in FIG. 1.
Figure 3:
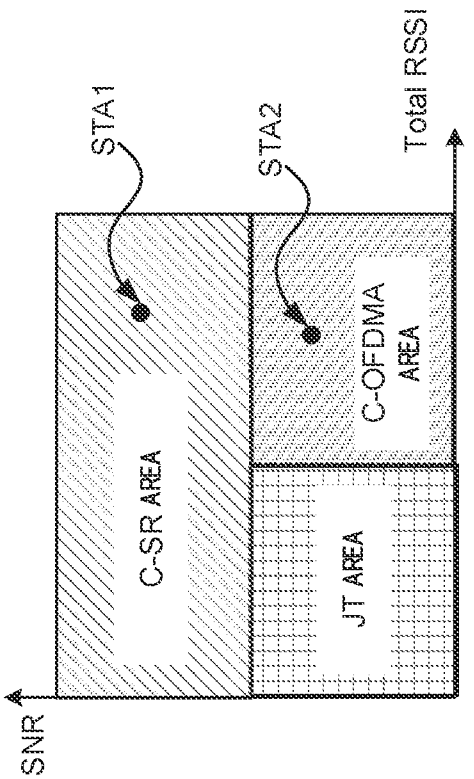
FIG. 3 illustrates exemplary differentiation between Multi-AP coordination schemes by SNR and RSSI.

FIG. 2 illustrates exemplary reception power of each of STA1 and STA2 illustrated in FIG. 1. FIG. 3 illustrates exemplary differentiation between Multi-AP coordination schemes by SNR and RSSI.

SNR (Signal-to-Noise Ratio) in FIGS. 2 and 3 is defined as SNR="RSSI of connected AP"/"RSSI of unconnected AP." Note that the RSSI of connected AP corresponds to RSSI of a signal received by STA from connected AP, and the RSSI of unconnected AP corresponds to RSSI of a signal received by STA from unconnected AP. RSSI is an abbreviation for a Received Signal Strength Indicator.

SNR of STA 1 is represented as $RSSI^{AP1,STA1}/RSSI^{AP2,STA1}$. SNR of STA 2 is represented as $RSSI^{AP2,STA2}/RSSI^{AP1,STA2}$. Note that $RSSI^{APm,STAn}$ indicates a signal strength (e.g., RSSI) of a signal received by STAn from APm. Further, in the following description. RSSI of a signal received from APm is sometimes referred to as RSSI from APm.

Note that, in an embodiment of the present disclosure, although "RSSI of connected AP"/"RSSI of unconnected AP" is defined as SNR, "RSSI of connected AP"/"RSSI of unconnected AP" may be referred to as a Signal-to-Interference Ratio (SIR), Signal-to-Interference Noise Ratio (SINR), Average Noise plus Interference Power Indicator (ANIPI) instead of SNR.

As illustrated in FIGS. 2 and 3, in STA 1, the ratio of RSSI from connected AP (e.g., AP 1 in FIGS. 1 to 3) to RSSI from unconnected AP (e.g., AP 2 in FIGS. 1 to 3) is relatively high, and thus SNR of STA 1 is high. On the other hand, in STA 2, the ratio of RSSI from connected AP (e.g., AP 2 in FIGS. 1 to 3) to RSSI from unconnected AP (e.g., AP 1 in FIGS. 1 to 3) is relatively low, and thus SNR of STA 2 is lower than that of STA 1.

In the case that the differentiation of MAP coordination schemes as in FIGS. 1 to 3 is defined, C-SR and C-OFDMA areas can be associated by SNR. For example, as illustrated in FIG. 3, an area where the SNR is equal to or greater than a certain threshold is associated with a C-SR area, and an area where the SNR is less than the certain threshold is associated with a C-OFDMA area (or JT area).

Further, C-OFDMA and JT areas may be differentiated by the total RSSI of each STA. For example, an area in which the total RSSI is equal to or greater than a certain threshold is associated with a C-OFDMA area, and an area in which the total RSSI is less than the certain threshold is associated with a JT area. As illustrated in FIG. 2, the total RSSI of each STA may be calculated by summing the reception power of signals received by each STA from APs that perform coordinated transmission (e.g., AP 1 and AP 2 and/or Sharing AP and Shared AP). In FIG. 3, the horizontal axis indicates total RSSI, but the horizontal axis may indicate RSSI of connected AP instead. That is, instead of performing threshold determination based on the total RSSI, the threshold determination may be performed using RSSI of connected AP, and then the association with the JT area and C-OFDMA area may be performed.

Note that, in the following description, a threshold provided between areas of MAP coordination schemes is sometimes referred to as a determination threshold. Further, among the determination thresholds, a threshold compared with SNR is sometimes referred to as an SNR Threshold, and a threshold compared with RSSI is sometimes referred to as an RSSI Threshold. Furthermore, the determination threshold is sometimes referred to as a MAP coordination scheme switching determination threshold or simply a threshold.

Note that, in FIGS. 1 to 3, three types of MAP coordination schemes, C-SR, C-OFDMA, and JT, are differentiated by SNR and RSSI, but the present disclosure is not limited thereto. For example, a measurement value different from SNR and RSSI may be used for differentiation between MAP coordination schemes, or one of SNR and RSSI need not be used for the differentiation of MAP coordination schemes. Further, a MAP coordination scheme different from the above-described three types may be included in the MAP coordination schemes to be differentiated, or at least one of the above-described three types need not be included in the MAP coordination schemes to be differentiated.

As described above, whether to switch MAP coordination schemes can be determined based on the measurement value of each Node. For example, each STA measures a signal received from each AP and determines whether to switch MAP coordination schemes based on the measurement value.

Then, in an embodiment of the present disclosure, a Node generates information on switching of MAP coordination schemes based on a measurement value of a signal received from another Node, and reports the generated information.

[Configuration of Radio Communication System]

The radio communication system according to the present embodiment may include, for example, a plurality of APs 100 and STAs 200. AP 100 may include, for example, both functions of Sharing AP and Shared AP, or may include either of the functions.

Figure 4A:
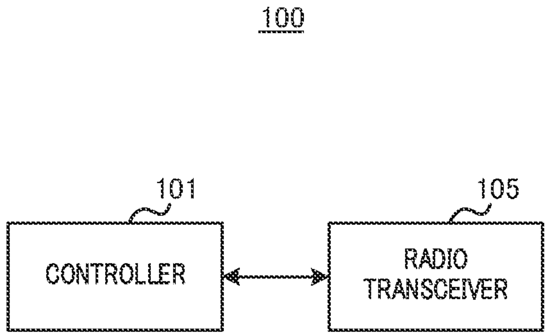
FIG. 4A is a block diagram illustrating an exemplary configuration of a part of AP according to an embodiment of the present disclosure.
Figure 4B:
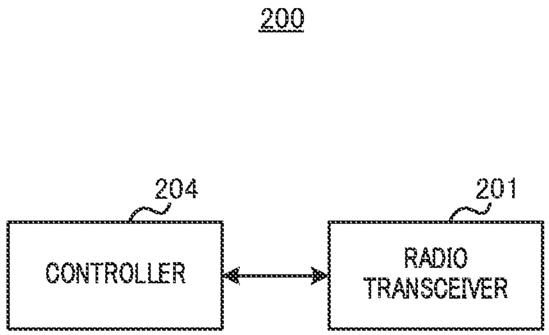
FIG. 4B is a block diagram illustrating an exemplary configuration of a part of STA according to an embodiment of the present disclosure.

FIG. 4A is a block diagram illustrating an exemplary configuration of a part of AP 100 according to the embodiment of the present disclosure. FIG. 4B is a block diagram illustrating an exemplary configuration of a part of STA 200.

AP 100 illustrated in FIG. 4A is an exemplary communication apparatus. In AP 100 illustrated in FIG. 4A, radio transceiver 105 transmits a signal for measurement to another communication apparatus (e.g., STA 200) and receives feedback information on switching of coordinated communication (e.g., MAP) from another communication apparatus (e.g., STA 200). Controller 101 controls coordinated communication with another communication apparatuses (e.g., STA 200) based on the feedback information.

STA200 illustrated in FIG. 4B is an exemplary communication apparatus. In STA 200 illustrated in FIG. 4B, controller 204 (e.g., corresponding to control circuitry) determines a measurement value by measuring signals received from a plurality of other communication apparatuses (e.g., APs 1000), and generates feedback information on switching of coordinated communication (e.g., MAP) based on the measurement value. Radio transceiver 201 (e.g., corresponding to transmission circuitry) transmits the feedback information.

Embodiment 1

[Exemplary Configuration of AP 100]

Figure 5:
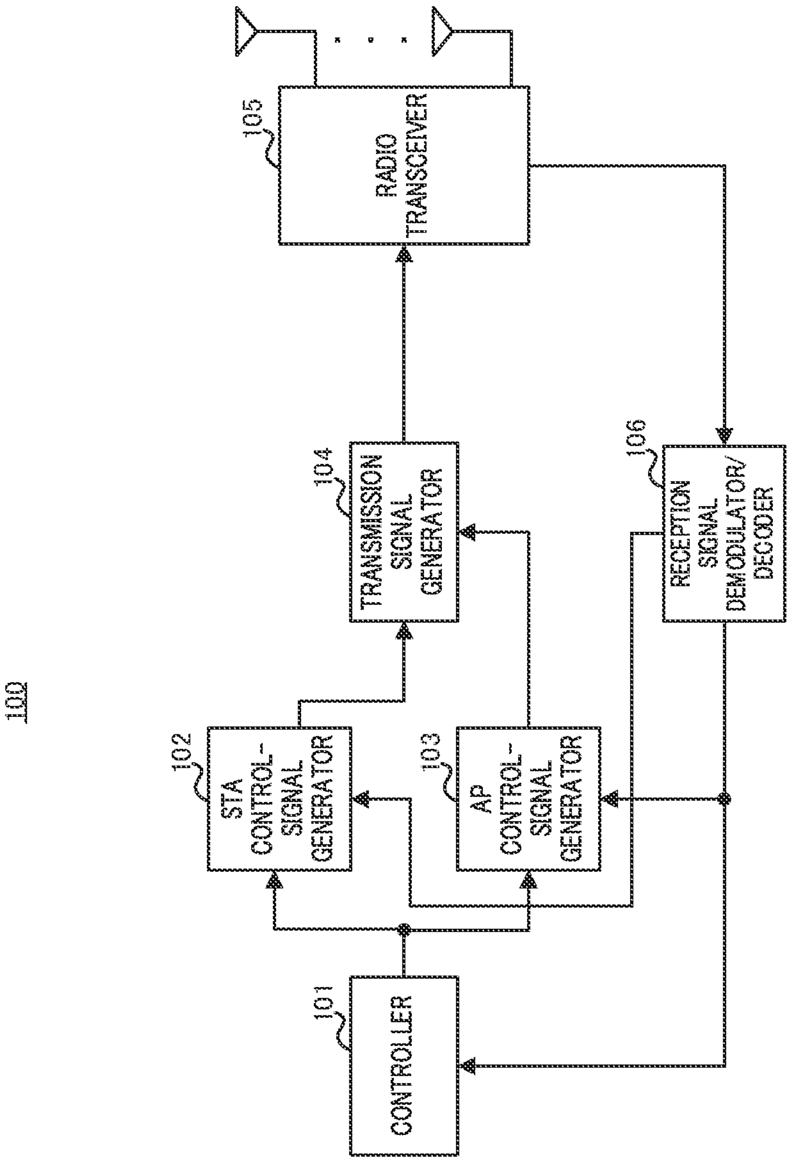
FIG. 5 is a block diagram illustrating an exemplary configuration of the AP according to Embodiment 1.

FIG. 5 is a block diagram illustrating an exemplary configuration of AP 100 according to Embodiment 1. AP 100 illustrated in FIG. 5 may include, for example, controller 101, control signal generator for STA (hereinafter, referred to as STA control-signal generator) 102, control signal generator for AP (hereinafter, referred to as AP control-signal generator) 103, transmission signal generator 104, radio transceiver 105, and reception signal demodulator/decoder 106.

Controller 101 may control a configuration of a transmission frame (or signal) including, for example, a MAP Trigger frame. For example, when AP 100 is Sharing AP, controller 101 may control generation of a control signal (e.g., MAP Trigger frame) for another AP 100 (e.g., Shared AP). Note that "another AP 100" corresponds to AP 100 that is different from AP 100 itself. The "another AP 100" may be Sharing AP or Shared AP.

Note that the transmission frame may be a transmission frame having any one of frame configurations to be described later.

Further, controller 101 may configure control information for STA 200 or another AP 100, for example. For example, controller 101 may configure resource allocation information for each STA 200 and scheduling information such as Modulation and Coding Scheme (MCS). Controller 101 may also determine a parameter related to transmission control (e.g., control of coordinated communication) (e.g., parameter related to coordinated communication) based on, for example, information inputted from reception signal demodulator/decoder 106 (e.g., control information indicated from Sharing AP to Shared AP). Controller 101 may, for example, output the control information including the determined transmission control parameter to STA control-signal generator 102 and AP control-signal generator 103.

Further, controller 101 may control, for example, coordinated communication for STA 200. For example, controller 101 controls, for STA 200, transmission of configuration information on the configuration of coordinated communication. The configuration information may include information used for an event report (example of feedback information) from STA 200. Further, for example, controller 101 controls, for STA 200, transmission of information (e.g., indication information) requesting an event report from STA 200. Furthermore, for example, controller 101 controls, for STA 200, transmission of a signal for measurement with which communication quality is measured. Moreover, for example, controller 101 controls switching of MAP coordination schemes based on the event report received from STA 200.

STA control-signal generator 102 may generate, for example, a control signal for STA 200 (e.g., Trigger frame), and output the generated control signal to transmission signal generator 104. STA control-signal generator 102 may also generate various signals for STA 200 under the control of controller 101, and may output the generated signals to transmission signal generator 104.

AP control-signal generator 103 may, for example, generate a control signal (e.g., MAP Trigger frame) for another AP 100. For example, AP control-signal generator 103 may generate a control signal based on the control information inputted from controller 101 and the information inputted from reception signal demodulator/decoder 106.

Transmission signal generator 104 may, for example, perform transmission processing on the control signal inputted from STA control-signal generator 102 or AP control-signal generator 103 or on data and an acknowledgement (ACK)/negative-acknowledgement (NACK), and may generate a radio frame (transmission signal). Transmission signal generator 104 outputs the generated transmission signal to radio transceiver 105.

Radio transceiver 105, for example, performs radio transmission processing, such as digital to analog (D/A) conversion or up-conversion to a carrier frequency, on the transmission signal inputted from transmission signal generator 104, and transmits the signal after the radio transmission processing via an antenna.

When AP 100 receives an uplink signal transmitted from STA 200 or a control signal transmitted from another AP 100, AP 100 may, for example, operate as described below.

The radio signal received via an antenna is inputted to radio transceiver 105. Radio transceiver 105, for example, performs radio reception processing such as down-conversion of a carrier frequency on the received radio signal, and outputs the signal after the radio reception processing to reception signal demodulator/decoder 106.

For example, reception signal demodulator/decoder 106 may perform processing such as autocorrelation processing on the signal inputted from radio transceiver 105, and extract the received radio frame. Further, reception signal demodulator/decoder 106 may, for example, decode and demodulate an uplink signal (e.g., response signal or feedback information) from STA 200 or a control signal (e.g., MAP Trigger frame) from another AP 100 included in the extracted radio frame. Reception signal demodulator/decoder 106 may, for example, output the control signal after demodulation to controller 101, STA control-signal generator 102, and AP control-signal generator 103.

[Exemplary Configuration of STA 200]

Figure 6:
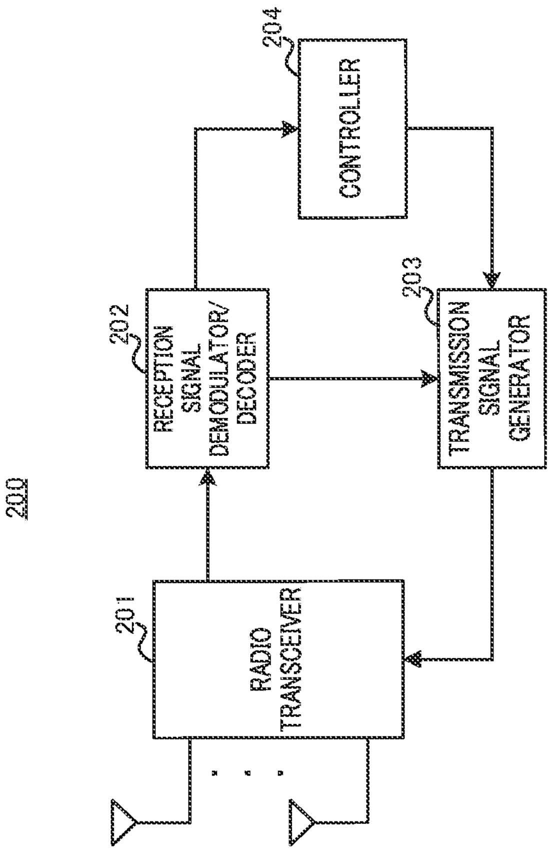
FIG. 6 is a block diagram illustrating an exemplary configuration of the STA according to Embodiment 1.

FIG. 6 is a block diagram illustrating an exemplary configuration of STA 200 according to Embodiment 1. STA 200 illustrated in FIG. 6 may include, for example, radio transceiver 201, reception signal demodulator/decoder 202, transmission signal generator 203, and controller 204.

Radio transceiver 201, for example, receives a signal transmitted from AP 100 via an antenna, performs radio reception processing such as down-conversion or analog to digital (A/D) conversion on the received signal, and outputs the signal after the radio reception processing to reception signal demodulator/decoder 202. Further, radio transceiver 201 may, for example, perform radio transmission processing such as D/A conversion and up-conversion to a carrier frequency on the signal inputted from transmission signal generator 203, and transmit the signal after the radio transmission processing via an antenna.

For example, reception signal demodulator/decoder 202 may perform processing such as autocorrelation processing on the signal inputted from radio transceiver 201, and extract the received radio frame. Reception signal demodulator/decoder 202 may, for example, demodulate and decode a control signal (e.g., Trigger frame) included in the extracted radio frame, and obtain an uplink transmission control parameter. Reception signal demodulator/decoder 202 may, for example, output the obtained uplink transmission control parameter to transmission signal generator 203.

Reception signal demodulator/decoder 202 outputs the received signal (e.g., Null data PPDU (NDP)) to controller 204.

Controller 204 controls coordinated communication (e.g., MAP coordination Scheme), for example. For example, controller 204 may measures a measurement value such as Channel State Information (CSI) and/or RSSI based on the received signal (e.g., Null data PPDU (NDP)). Controller 204 generates feedback information on switching of coordinated communication (e.g., MAP coordination scheme) based on the measurement value.

For example, controller 204 compares the measurement value with a threshold included in the configuration information received from another communication apparatus (e.g., Sharing AP), and determines whether to switch MAP coordination Schemes based on the comparison result. Controller 204 may generate feedback information indicating the determination result, and may output the generated feedback information to transmission signal generator 203.

The example of the comparison between the threshold and the measurement value and the example of the feedback information will be described later.

Transmission signal generator 203 may perform transmission signal processing on an uplink signal (e.g., signal including feedback information) based on the uplink transmission control parameter inputted from reception signal demodulator/decoder 202, and generate a radio frame (transmission signal). Transmission signal generator 203, for example, outputs the generated transmission signal to radio transceiver 201.

Next, exemplary transmission and reception of information on switching of MAP coordination schemes is described.

In Embodiment 1, a determination threshold is indicated by an Event Request element, and switching of MAP coordination schemes is reported by an Event Report element. The indication of the determination threshold by the Event Request element is an example of transmission of configuration information on a threshold. Further, the report of switching of MAP coordination schemes by the Event Report element is an example of transmission of feedback information on switching of MAP coordination schemes.

Furthermore, the indication of the determination threshold may be regarded as an example of Request of MAP coordination scheme switching event. In addition, the report of switching of MAP coordination schemes may be regarded as an example of Report of MAP coordination scheme switching event.

Figure 7B:
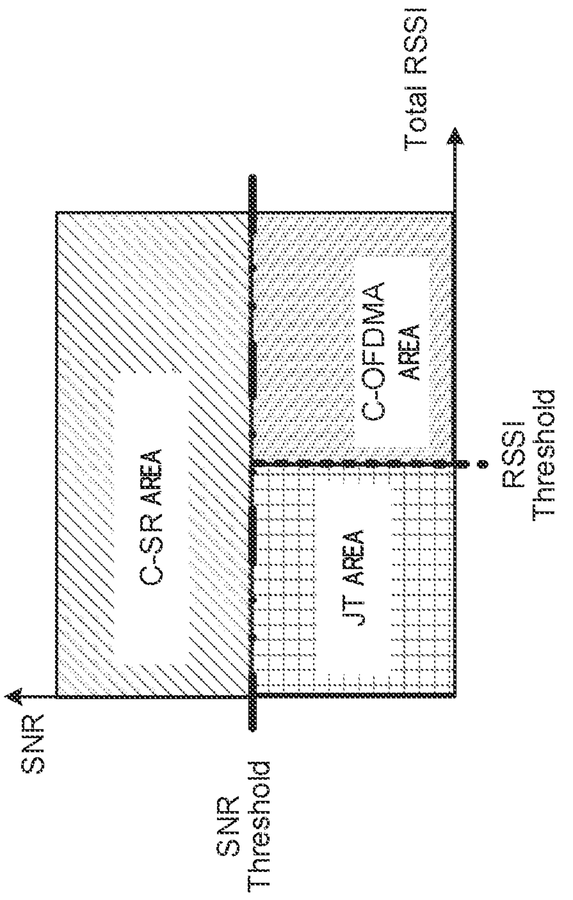
FIG. 7B illustrates an exemplary SNR/RSSI threshold configuration of Multi-AP coordination schemes.

FIG. 7A illustrates an exemplary Event Request element. FIG. 7B illustrates an exemplary SNR/RSSI threshold configuration of Multi-AP coordination schemes. FIG. 7A illustrates an Event Request element of IEEE P802.11-REVme™/D1.0, 9.4.2.66 as an example. FIG. 7B illustrates two determination thresholds that are configured to correspond to the same differentiation of MAP coordination schemes as in FIG. 3.

In FIG. 7A, for example, "Multi-AP Feedback" is defined as "222" in the "Event Type." Then, in the case that the "Event Type" is set to "222," an "Event Request" corresponding to the "Multi-AP Feedback" may be defined. Note that defining "Multi-AP Feedback" as "222" in the "Event Type" may be considered as associating "222" and "Multi-AP Feedback" together in the "Event Type."

The "Event Request" includes, for example, "Subelement ID," "SNR Threshold," and "RSSI Threshold," as illustrated in FIG. 7A. Further, the "Subelement ID" includes identification information defined in association with the number of "SNR Threshold" and the number of "RSSI Threshold."

For example, when "Subelement ID"=3, the number of "SNR Threshold" and the number of "RSSI Threshold" are each "L."

The Event Request element may be included in an Event Request frame. The Event Request frame is defined, for example, in IEEE P802.11-REVme™/D1.0, 9.6.13.2.

In the example of FIG. 7A, one frequency band is assumed, but the present disclosure is not limited thereto. For example, a determination threshold (e.g., SNR Threshold and/or RSSI Threshold) may be provided for each of a plurality of frequency bands. For example, a determination threshold may be provided for every 20 MHz bandwidth.

Further, a determination threshold may be changed depending on a Device Class (e.g., Class A/B) of the Node. Alternatively, a threshold set having a plurality of MAP coordination scheme candidates may be provided. In the case that a threshold set having a plurality of MAP coordination scheme candidates is provided, each Node may be configured to select a threshold from the threshold set.

As illustrated in the exemplary SNR/RSSI threshold configuration of Multi-AP coordination schemes in FIG. 7B, one SNR Threshold indicating a boundary between a C-SR area and a C-OFDMA area or JT area is provided. Further, as illustrated in FIG. 7B, one RSSI Threshold indicating a boundary between the C-OFDMA area and the JT area is provided. Determination thresholds can be defined as described above.

FIG. 8 illustrates an exemplary Event Report element. FIG. 8 illustrates an example that is based on the Event Request element of IEEE P802.11-REVme™/D1.0, 9.4.2.67.

To the "Event Type." a value specified by the Event Request element illustrated in FIG. 7A is configured. For example, for the "Multi-AP Feedback," "Event Type"=222 is configured.

An "Event Report" is defined corresponding to the "Event Type." The "Event Report" includes, for example, "Subelement ID" and "Indicator ("Indicators that the threshold is exceeded" in FIG. 8)" as illustrated in FIG. 8.

The "Subelement ID" may be the same as that defined in the Event Request (e.g., FIG. 7A). For example, the "Subelement ID" includes identification information defined in association with the number of "SNR Threshold" and the number of "RSSI Threshold."

The "Indicator" includes a determination result that is based on the determination threshold included in the Event Request. For example, when one SNR Threshold and one RSSI Threshold are included in the Event Request, the Indicator includes information (e.g., indicator) indicating whether the measured SNR exceeds the SNR Threshold and information (e.g., indicator) indicating whether the measured RSSI exceeds the RSSI Threshold. The number of Indicators is the sum of the number of SNR Thresholds and the number of RSSI Thresholds defined by Subelement ID.

The determination as to whether the measurement value (e.g., measured SNR and/or measured RSSI) exceeds the threshold may be regarded as determination as to whether to switch MAP coordination schemes. For example, in the example illustrated in FIG. 7B, the determination that the SNR measured at a certain point in time does not exceed the SNR Threshold, but the SNR measured at a subsequent point in time exceeds the SNR Threshold may be regarded as the determination that the MAP coordination scheme is switched to C-SR.

The Event Report element may be included in an Event Report frame. The Event Report frame is defined, for example, in IEEE P802.11-REVme™/D1.0, 9.6.13.3.

As described above, in Embodiment 1, a determination threshold is indicated by an Event Request element, and switching of MAP coordination schemes is reported by an Event Report element. By reporting switching of MAP coordination schemes, not measurement values but information on switching of MAP coordination schemes can be fed back, which reduces the amount of information to be fed back. Further, feedback is performed when the MAP coordination scheme is switched, and feedback need not be performed when the MAP coordination scheme is not switched, so that the opportunity of feeding back measurement values can be reduced. Reducing the opportunity of feeding back measurement values and the amount of information to be fed back can improve system throughput.

Embodiment 2

The configurations of APs and STAs according to Embodiment 2 may be the same as those in Embodiment 1.

In Embodiment 2, a frame and element for a MAP coordination scheme switching event are defined, and Request and Report of the MAP coordination scheme switching event are performed by the defined frame and element. Note that, in Embodiment 2, the newly defined frame and element are exemplarily referred to as a MAP Action frame and a MAP Events element, respectively.

Figure 9:
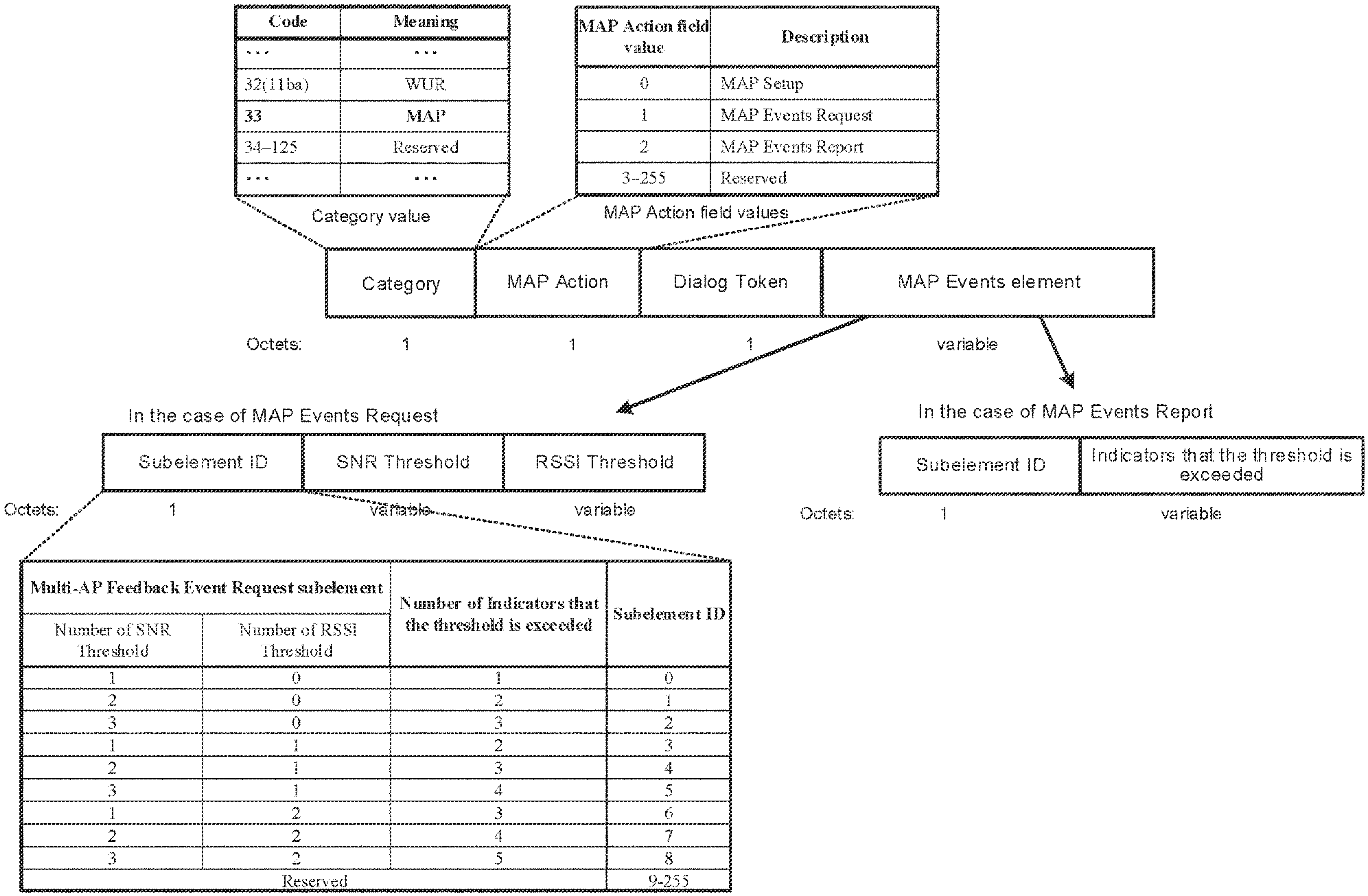
FIG. 9 illustrates an exemplary MAP Action frame and MAP Events element.

FIG. 9 illustrates an exemplary MAP Action frame and MAP Events element.

In Embodiment 2, a Code for MAP is newly defined in a Category field. For example, in the example of FIG. 9, Code=33 is defined as a Code for MAP. When the Category indicates MAP, a MAP Action field is provided.

The MAP Action field defines an operation related to MAP. For example, the operation related to MAP includes an operation of performing Request of a MAP event and an operation of performing Report of a MAP event. For example, in the example of FIG. 9, MAP Events Request is defined for MAP Action field value=1, and MAP Events Report is defined for MAP Action field value=2.

When MAP Action indicates MAP Events Request (e.g., when MAP Action field value=1), the content of the MAP Events element may be an Event Request that is the same as the Event Request described in Embodiment 1. For example, as illustrated in FIG. 7A, the MAP events element may include "Subelement ID," "SNR Threshold," and "RSSI Threshold."

Further, when MAP Action indicates MAP Events Report (e.g., when MAP Action field value=2), the content of the MAP Events element may be an Event Report that is the same as the Event Report described in Embodiment 1. For example, as illustrated in FIG. 8, the MAP Events element may include "Subelement ID" and "Indicator ("Indicators that the threshold is exceeded" in FIG. 9).

In other words, in Embodiment 2, a determination threshold is indicated by a MAP Event element defined in a MAP Action frame, and switching of MAP coordination schemes is reported by a MAP Event element defined in a MAP Action frame. The indication of a determination threshold by the MAP Event element defined in the MAP Action frame is an example of transmission of configuration information on a threshold. The report of switching of MAP coordination schemes by the MAP Event element defined in the MAP Action frame is an example of transmission of feedback information on switching of MAP coordination schemes.

As described above, in Embodiment 2, a MAP Action frame and MAP Events element are defined, and Request of a MAP coordination scheme switching event (e.g., indication of a determination threshold) and Report of the MAP coordination scheme switching event are performed. By this operation, not measurement values but information on switching of MAP coordination schemes can be fed back, which reduces the amount of information to be fed back. Further, the opportunity of feeding back measurement values and information to be fed back can be reduced, thereby improving system throughput.

Embodiment 3

The configurations of APs and STAs according to Embodiment 3 may be the same as those in Embodiment 1.

In Embodiment 3, Request of a MAP coordination scheme switching event is performed by STA Statistics request included in Radio Measurement Request frames.

Further, in Embodiment 3, Report of the MAP coordination scheme switching event is performed by STA Statistics report included in Radio Measurement Report frames.

Note that the Radio Measurement Request frames are defined in IEEE P802.11-REVme™/D1.0, 9.6.6.2 and the STA Statistics request is defined in IEEE P802.11-REVme™/D1.0, 9.4.2.20.9. Further, the Radio Measurement Report frames are defined in IEEE P802.11-REVme™/D1.0, 9.6.6.3, and the STA Statistics report is defined in IEEE P802.11-REVme™/D1.0, 9.4.2.21.9.

Figure 10A:
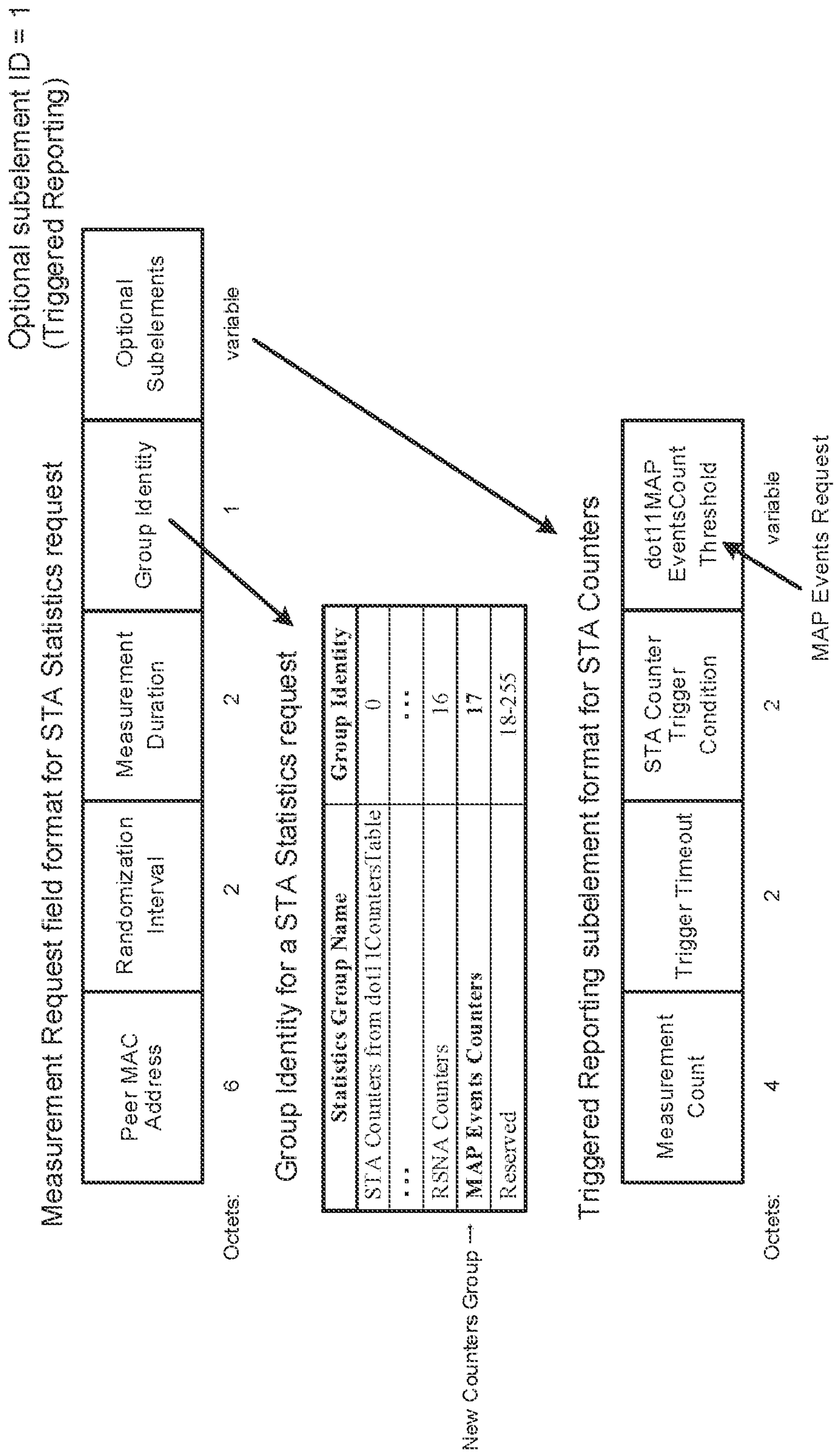
FIG. 10A illustrates an exemplary STA Statistics request.
Figure 10B:
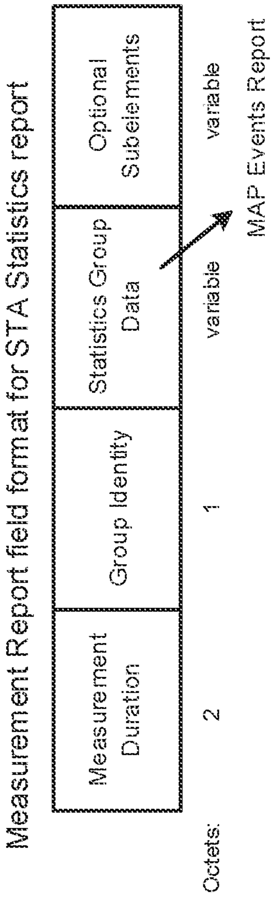
FIG. 10B illustrates an exemplary STA Statistics report.

FIG. 10A illustrates an exemplary STA Statistics request. FIG. 10B illustrates an exemplary STA Statistics report. As illustrated in FIGS. 10A and 10B, MAP Events Counters is defined as a Counters Group for MAP in the STA Statistics request. In the example of FIG. 10A, MAP Events Counters is defined for Group Identity=17.

When "Group Identity" is configured as MAP Events Counters (e.g., when Group Identity=17), "Triggered Reporting subelement" includes "dot11MAP EventsCount Threshold," which is an event threshold for MAP (example of determination threshold). The content of "dot11MAP EventsCount Threshold" may be an Event Request that is the same as the Event Request described in Embodiment 1. For example, as illustrated in FIG. 7A, the "dot11MAP Events-Count Threshold" may include "Subelement ID," "SNR Threshold." and "RSSI Threshold."

As illustrated in FIG. 10B, the Measurement Report field includes "Statistics Group Data." The content of "Statistics Group Data" may be an Event Report that is the same as the Event Report described in Embodiment 1. For example, as illustrated in FIG. 8, the "Statistics Group Data" may include "Subelement ID" and "Indicator ("Indicators that the threshold is exceeded" in FIG. 8).

As described above, in Embodiment 3, Request of a MAP coordination scheme switching event is performed by STA Statistics request included in Radio Measurement Request, and Report of the MAP coordination scheme switching event is performed by STA Statistics report included in Radio Measurement Report frames. By this operation, not measurement values but information on switching of MAP coordination schemes can be fed back, which reduces the amount of information to be fed back. Further, the opportunity of feeding back measurement values and information to be fed back can be reduced, thereby improving system throughput.

Operation Example of Embodiments 1 to 3

An operation example of the above-described Embodiments 1 to 3 is described.

Figure 11:
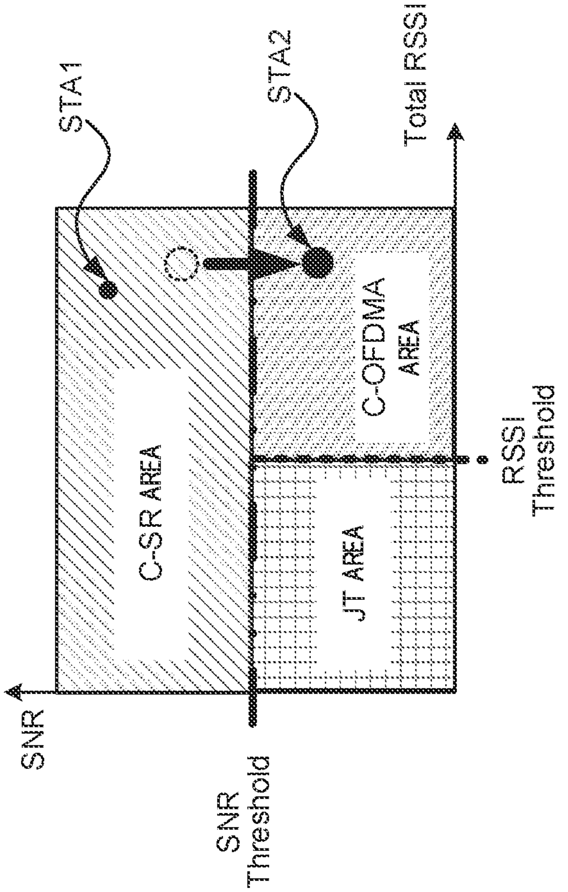
FIG. 11 illustrates another exemplary SNR/RSSI threshold configuration of Multi-AP coordination schemes.

FIG. 11 illustrates an exemplary SNR/RSSI threshold configuration of Multi-AP coordination schemes. Note that FIG. 11 illustrates an example in which STA 1 is located in the C-SR area and STA 2 moves from the C-SR area to the C-OFDMA area. Note that the position of STA1 in the plane defined by SNR and total RSSI illustrated in FIG. 11 corresponds to the position indicated by SNR and total RSSI that are based on the measurement value measured by STA 1. Hereinafter, the point indicating STA 1 corresponds to the point indicated by SNR and total RSSI that are based on the measurement value measured by STA 1. The same applies to STA 2.

Note that the movement of the point indicating STA 2 from the C-SR area to the C-OFDMA area may be a movement caused by STA 2 physically changing its position, a movement caused by the communication environment around STA 2 changing and the measurement value of STA 2 changing, or a movement caused by a combination of these factors.

Figure 12:
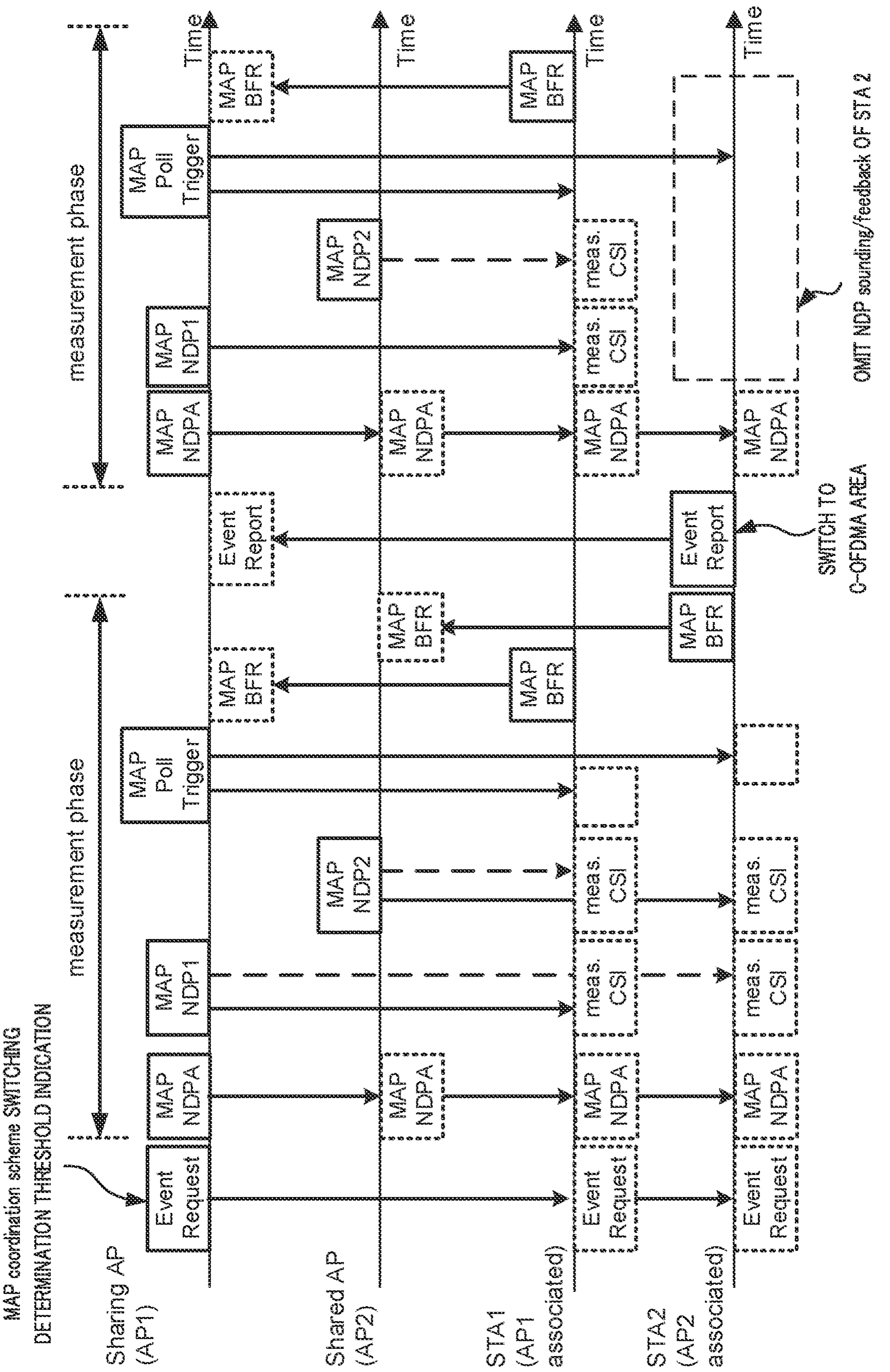
FIG. 12 illustrates exemplary control operations in the situation illustrated in FIG. 11.

FIG. 12 illustrates exemplary control operations in the situation illustrated in FIG. 11. FIG. 13 illustrates feedback information for each MAP coordination scheme. The horizontal axis in FIG. 12 represents a time axis.

Note that the operations illustrated in FIG. 12 are operations executed in the above-described Embodiments 1 to 3.

In FIG. 12, an Event Request frame is transmitted from Sharing AP (AP 1) to STA 1 and STA 2. A MAP coordination scheme switching determination threshold is indicated to STA 1 and STA 2 by the Event Request frame.

Note that the Event Request frame is an Event Request frame defined in IEEE P802.11-REVme™/D1.0, 9.6.13.2 in Embodiment 1, a MAP Action frame in Embodiment 2, and Radio Measurement Request frames in Embodiment 3.

After the Event Request frame is transmitted from Sharing AP (AP 1) to STA 1 and STA 2, a measurement phase starts. In the measurement phase, AP 1 transmits Null data PPDU Announcement (NDPA) for MAP to Shared AP (AP 2), STA 1, and STA 2. The MAP NDPA specifies the specifications of the measurement performed by each STA receiving Null data PPDU (NDP) transmitted from each AP (AP 1 and AP 2).

In the example of FIG. 12, AP 1 and AP 2 each transmit NDP (in FIG. 12, exemplarily, MAP NDP1 and MAP NDP2). STA 1 and STA 2 receive NDP transmitted by each of AP 1 and AP 2, and measure Channel State Information (CSI) of NDP received from each of AP 1 and AP 2.

Note that an example in which the information to be measured (e.g., measurement value) is CSI is described, but the present disclosure is not limited thereto. For example, the measurement value may include SNR, RSSI, and/or the like.

Sharing AP (AP 1) transmits, to each STA, a MAP Poll Trigger requesting feedback on CSI measured by STA. Sharing AP (AP 1) receives MAP BFR, which is a beamforming report (BFR) for MAP, from each STA. The MAP BFR includes CSI information.

In the example of FIG. 12, AP of the connection destination of STA is instructed to receive CSI. That is, AP 1 receives CSI from STA 1 connected to AP 1, and AP 2 receives CSI from STA 2 connected to AP 2.

Note that FIG. 12 illustrates an example in which Sharing AP (AP 1) collectively transmits a MAP Poll Trigger to STA 1 and STA 2, but the present disclosure is not limited thereto. For example, two-stage control may be configured in which Shared APs (AP 1 and AP 2) transmit MAP Poll Triggers to STAs respectively connected to the Shared APs and receive responses (e.g., CSI) from the STAs respectively connected to the Shared APs. For example, AP 1 may transmit a MAP Poll Trigger to STA 1 and receive a response from STA 1, and AP 2 may transmit a MAP Poll Trigger to STA 2 and receive a response from STA 1.

Note that although FIG. 12 illustrates exemplary control using NDP, each AP may transmit a Basic Trigger frame, STA that has received the Basic Trigger frame may measure CSI of the received Basic Trigger frame, and each AP may receive the CSI measured by the STA.

The area of STA 2 changes from the C-SR area to the C-OFDMA area as a result of the measurement phase, STA 2 reports to Sharing AP (AP 1) an event of switching to the C-OFDMA area in an Event Report frame. Note that, as illustrated in FIG. 11, no switching of MAP coordination schemes is performed on STA 1, and thus STA 1 need not transmit an Event report frame as illustrated in FIG. 12.

Note that the Event Report frame is an Event Report frame defined in IEEE P802.11-REVme™/D1.0, 9.6.13.3 in Embodiment 1, a MAP Action frame in Embodiment 2, and a Radio Measurement Report frame in Embodiment 3.

Note that, in the example of FIG. 12, a case has been described in which STA transmits the report of the event once when the MAP coordination scheme is switched, but the present disclosure is not limited thereto. For example, STA may transmit an event report limited to cases in which the measurement value changes by a specified relative-threshold or more within the same MAP coordination scheme. In other words, an event report indicating a change by a specified relative-threshold or more within a MAP coordination scheme may be transmitted not only when the MAP coordination scheme is switched, but also when the MAP coordination scheme is not switched.

Sharing AP (AP 1) that has received the event report from STA 2 recognizes that STA 2 is located in the C-OFDMA area. As illustrated in FIG. 13, feedback information is not used for C-OFDMA. Thus, because STA 2 is located in the C-OFDMA area in the measurement phase after AP1 receives the event report, NDP sounding (measurement) in STA 2 and feedback from STA2 are omitted.

As illustrated in FIG. 12, after the MAP coordination scheme switching event report is transmitted, STA feeds back only the information required for the switched MAP coordination scheme. Such feedback control results in reduction in the information amount of feedback of the measurement values, thereby improving system throughput.

Note that the opportunity of transmitting and receiving an Event Report frame for one transmission and reception of an Event Request frame is not limited to one, and may occur multiple times. For example, STA may further transmit an Event Report frame for the first Event Request frame after the second measurement phase of FIG. 12.

Embodiment 4

The configurations of APs and STAs according to Embodiment 4 may be the same as those in Embodiment 1.

In Embodiment 4, a hysteresis function is provided in the condition of MAP coordination scheme switching event report.

Figure 14:
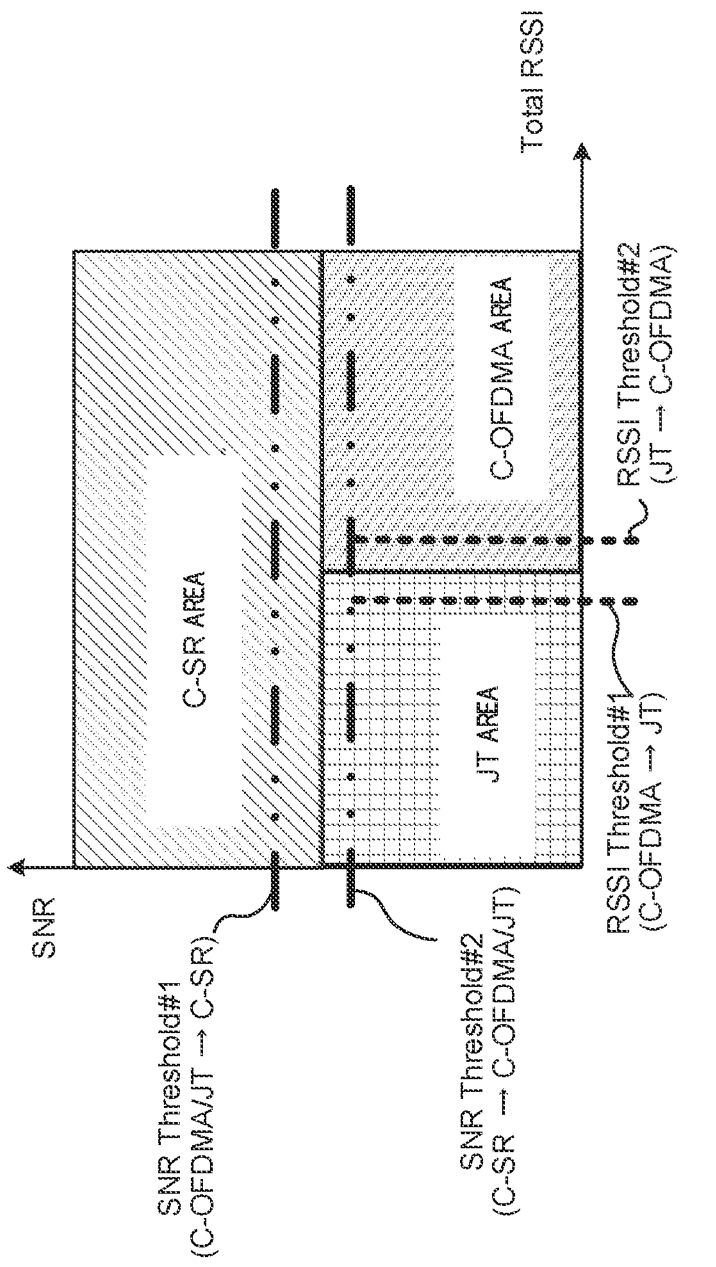
FIG. 14 illustrates an example in which different thresholds are provided for directions of switching MAP coordination schemes.

FIG. 14 illustrates an example in which different thresholds are provided for directions of switching MAP coordination schemes.

As illustrated in FIG. 14, for example, a threshold (SNR Threshold #2) for a direction of switching from the C-SR area to the C-OFDMA area and a threshold (SNR Threshold #1) for a direction of switching from the C-OFDMA area to the C-SR area are each provided. For example, the threshold for the direction of switching from the C-SR area to the C-OFDMA area may be set to lower than the threshold for the direction of switching from the C-OFDMA area to the C-SR area. This threshold configuration can suppress frequent switching of MAP coordination schemes resulting from variations or the like in measurement values for STAs located around the boundary between the C-SR area and the C-OFDMA area, and can suppress an increase in the number of transmissions of MAP coordination scheme switching event report.

Note that thresholds in the case that different thresholds are provided for directions of switching MAP coordination schemes may be indicated by, for example, an Event Request frame.

Figure 15:
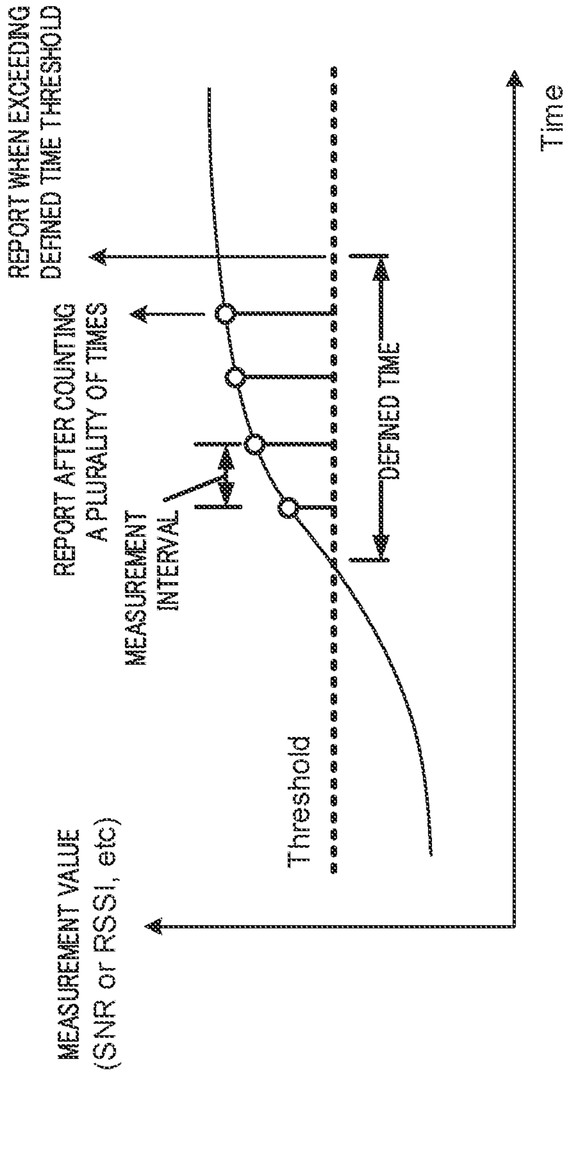
FIG. 15 illustrates exemplary determination of switching MAP coordination schemes.

FIG. 15 illustrates exemplary determination of switching MAP coordination schemes. The horizontal axis in FIG. 15 represents time, and the vertical axis represents a measurement value (e.g., SNR, or RSSI). FIG. 15 illustrates a measurement value that changes over time and a threshold compared with the measurement value.

As illustrated in FIG. 15, the number of times the measurement value exceeds the threshold for switching is counted a plurality of times at regular intervals, and when the counted number of times is equal to or greater than a predetermined number of times, a MAP coordination scheme switching event report may be transmitted. Alternatively, as illustrated in FIG. 15, a time during which a state of the measurement value exceeding a threshold for switching continues is measured, and when the measured time is equal to or longer than a defined time, a MAP coordination scheme switching event report may be transmitted. As illustrated in FIG. 15, whether to perform MAP coordination scheme switching event report is determined based on the number of times the measurement value exceeds the threshold for switching or a time during which a state of the measurement value exceeding the threshold for switching continues, thereby improving the reliability.

Note that the predetermined number of times compared with the counted number of times may vary depending on the direction of switching MAP coordination schemes. Further, the defined time compared with the time during which a state of the measurement value exceeding the threshold for switching continues may vary depending on the direction of switching MAP coordination schemes.

As described above, in Embodiment 4, providing a hysteresis function as the condition of the MAP coordination scheme switching event report can suppress the number of event reports and can limit the reports to highly reliable ones. Further, suppressing the number of event reports results in reduction in the amount of feedback information. The reduction in the amount of feedback information improves system throughput.

Note that, in the above description, an example of providing different thresholds for directions of switching MAP coordination schemes, an example of counting the number of times the measurement value exceeds a threshold for switching, and an example of measuring a time during which a state of the measurement value exceeding a threshold for switching continues have been described as an example of the hysteresis function, but these hysteresis functions may be used in combination. For example, different thresholds may be provided for directions of switching MAP coordination schemes, and the number of times the measurement value exceeds a provided threshold may be counted. Then, whether to transmit a MAP coordination scheme switching event report may be determined based on whether the counted number of times is equal to or greater than a predetermined number of times. Note that, in this case, the predetermined number of times compared with the counted number of times may vary depending on the direction of switching MAP coordination schemes.

Further, in the above description, the information on the hysteresis function (e.g., at least one of a plurality of thresholds, a predetermined number of times compared with the counted number of times, and a defined time) may be preconfigured, or may be included in an Event Request frame described in Embodiments 1 to 3 and the like.

Embodiment 5

The configurations of APs and STAs according to Embodiment 5 may be the same as those in Embodiment 1.

In Embodiment 5, a report on a MAP coordination scheme is received from a Node. In Embodiment 5, exemplarily, Sharing AP requests MAP coordination scheme switching request collection and/or NDP sounding request collection by a Trigger frame. The Trigger frame for requesting MAP coordination scheme switching request collection and/or NDP sounding request collection corresponds to exemplary indication information requesting feedback information.

Figure 16:
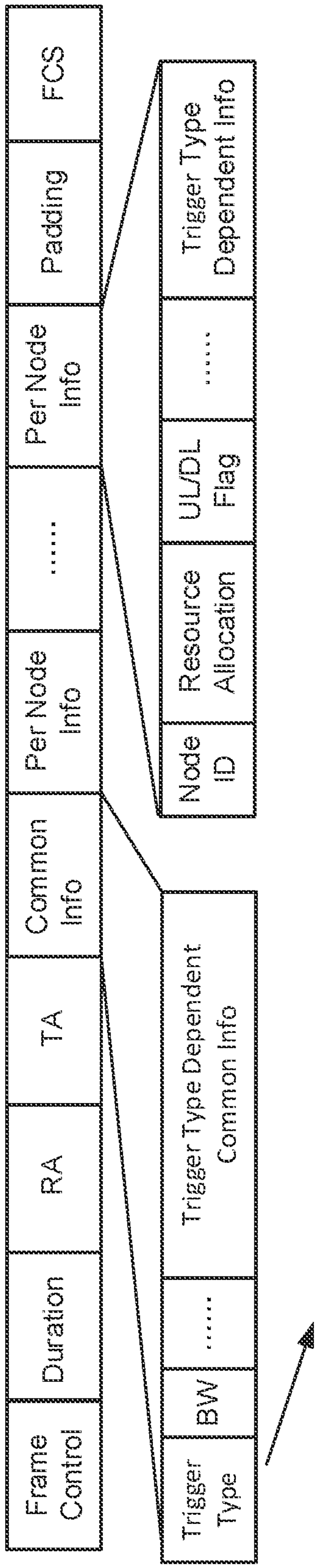
FIG. 16 illustrates a MAP Trigger frame format and an exemplary definition of a Trigger Type subfield according to Embodiment 5.

FIG. 16 illustrates a MAP Trigger frame format and an exemplary definition of a Trigger Type subfield according to Embodiment 5.

In the example illustrated in FIG. 16, a value indicating MAP coordination scheme switching request collection and a value indicating NDP sounding request collection are defined as 8 and 9, respectively, in a Trigger Type subfield.

When the Trigger Type is configured as the MAP coordination scheme switching request collection, this means collecting a report of the presence or absence of a MAP coordination scheme switching event from each of a plurality of Nodes.

When the Trigger Type is configured as the NDP sounding request collection, this means collecting a report of the presence or absence of NDP sounding and feedback request of NDP sounding from a plurality of Nodes.

Note that, in the example of FIG. 16, two Trigger Types are defined, but either the MAP coordination scheme switching request collection or the NDP sounding request collection may be defined.

To the MAP coordination scheme switching request collection requested by the Trigger frame, each Node may respond by any frame of NDP feedback report. Data frames, and/or multiplexing with Control frames including an Ack frame, BlockAck frame, and the like.

Figure 17:
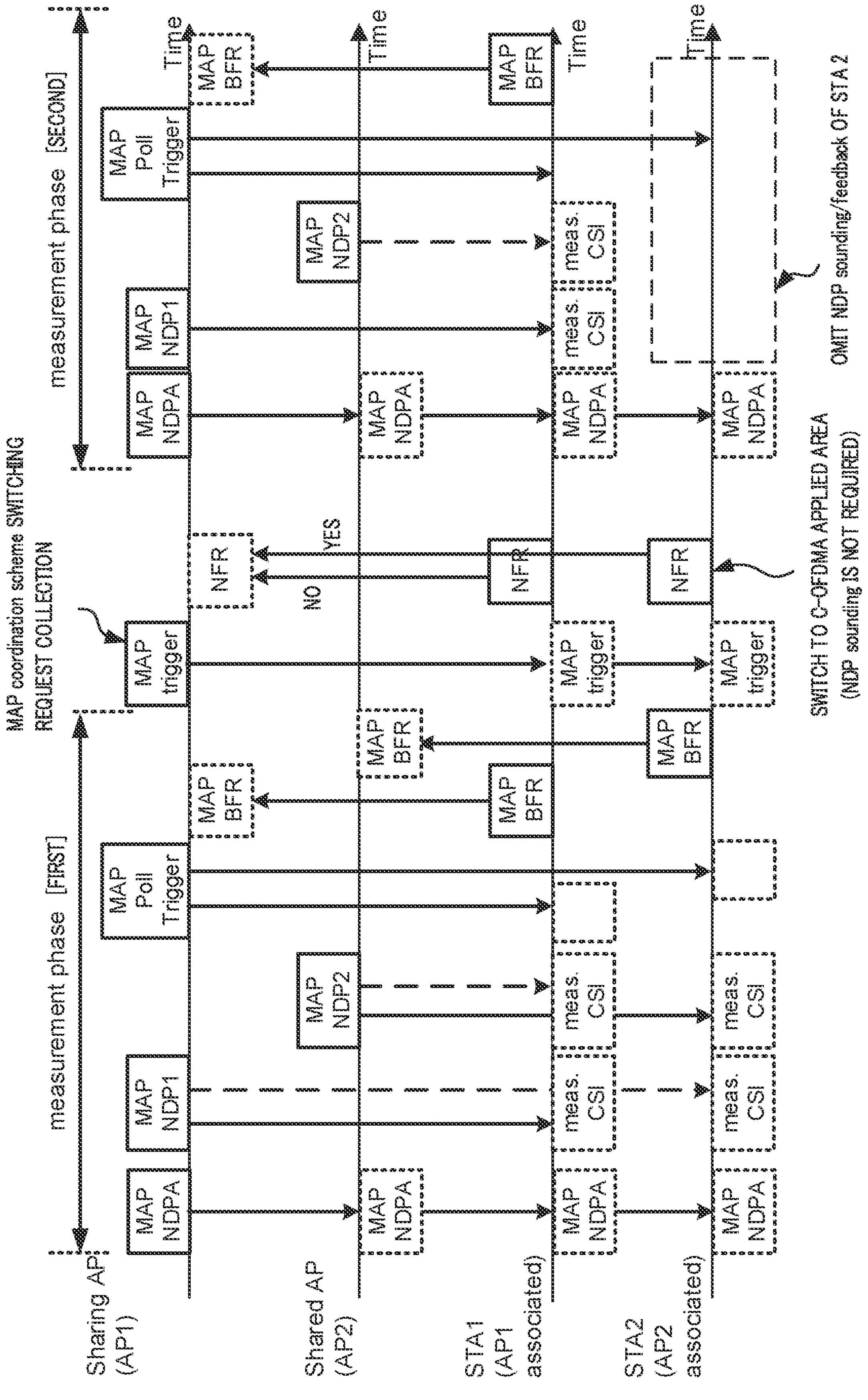
FIG. 17 illustrates exemplary operations in the case that a Trigger Type is MAP coordination scheme switching request collection.
Figure 18:
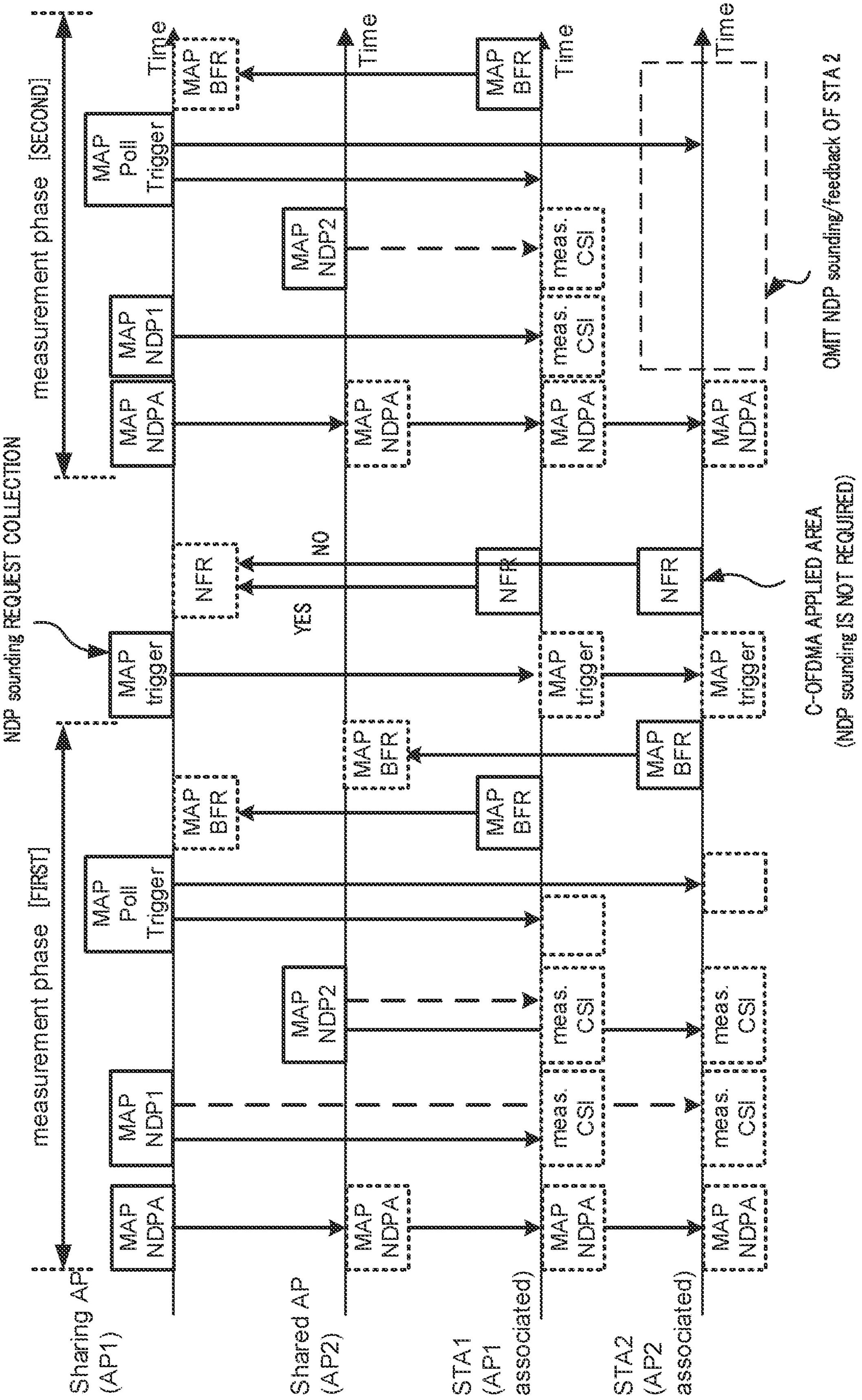
FIG. 18 illustrates exemplary operations in the case that a Trigger Type is NDP sounding request collection.

FIG. 17 illustrates exemplary operations in the case that the Trigger Type is MAP coordination scheme switching request collection. FIG. 18 illustrates exemplary operations in the case that the Trigger Type is NDP sounding request collection. The horizontal axis in each of FIGS. 17 and 18 represents a time axis.

Note that the operations in the measurement phases in FIGS. 17 and 18 are the same as the operations in the measurement phases described in Embodiments 1 to 3. Further, FIG. 17 illustrates a case in which two measurement phases are the first measurement phase (illustrated as measurement phase [first] in FIG. 17) and the second measurement phase (illustrated as measurement phase [second] in FIG. 17), but the present disclosure is not limited thereto. For example, the first measurement phase and the second measurement phase may be replaced with a measurement phase at a certain point in time and a measurement phase at the subsequent point in time, respectively.

Further, although omitted in FIG. 17, an Event Request frame may be transmitted by Sharing AP (AP 1) before the measurement phase [first] as in FIG. 12.

In FIG. 17, after the measurement phase [first], Sharing AP (AP 1) transmits a MAP Trigger frame in which Trigger Type="MAP coordination scheme switching request collection" is configured. For the MAP Trigger frame transmitted from AP 1, STA 1 and STA 2 each report performing or not performing of MAP coordination scheme switching.

In the example of FIG. 17, a case is assumed in which the MAP coordination scheme of STA1 is not switched from the C-SR area, and thus STA 1 reports that MAP coordination scheme switching is not performed. In the example FIG. 17, a case is assumed in which the MAP coordination scheme of STA 2 is switched from the C-SR area to the C-OFDMA area, and thus STA 2 reports that MAP coordination scheme switching is performed.

In FIG. 18, after the measurement phase [first], Sharing AP (AP 1) transmits a MAP Trigger frame in which Trigger Type="NDP sounding request collection" is configured. For the MAP Trigger frame transmitted from AP 1, STA 1 and STA 2 each report performing or not performing of NDP sounding.

In the example of FIG. 18, a case is assumed in which STA 1 is located in the C-SR area. NDP sounding is required for C-SR, and thus STA 1 reports that NDP sounding is performed. In FIG. 18, a case is assumed in which STA 2 is located in the C-OFDMA area. NDP sounding is not required for C-OFDMA, and thus STA 2 reports that NDP sounding is not performed.

As described above, in Embodiment 5, Sharing AP receives a report on a MAP coordination scheme from each STA, and thus, when NDP sounding and the feedback thereon are not required, an operation related to the NDP sounding and the feedback thereon can be omitted in accordance with the exemplary feedback information of each MAP coordination scheme illustrated in FIG. 13. The omission of NDP sounding may correspond to the omission of measuring NDP.

Note that, in responding to the MAP Trigger frame in FIGS. 17 and 18, STAs simultaneously (or within the same time interval) feed back using an NDP feedback report (NFR), but the present disclosure is not limited thereto. For example, in responding to the MAP Trigger frame, STAs may feed back by any frame of Data frames and multiplexing with Control frames including an Ack frame, BlockAck frame, and the like.

As described above, in Embodiment 5, receiving a report related to a MAP coordination scheme (e.g., report for the request of MAP coordination scheme switching request collection) by a Trigger frame results in reduction in the information amount of feedback of measurement values, thereby improving system throughput.

Embodiment 6

The configurations of APs and STAs according to Embodiment 6 may be the same as those in Embodiment 1.

In Embodiment 6, parameters required for Link Adaptation includes information on a recommended MAP coordination scheme.

Figure 19:
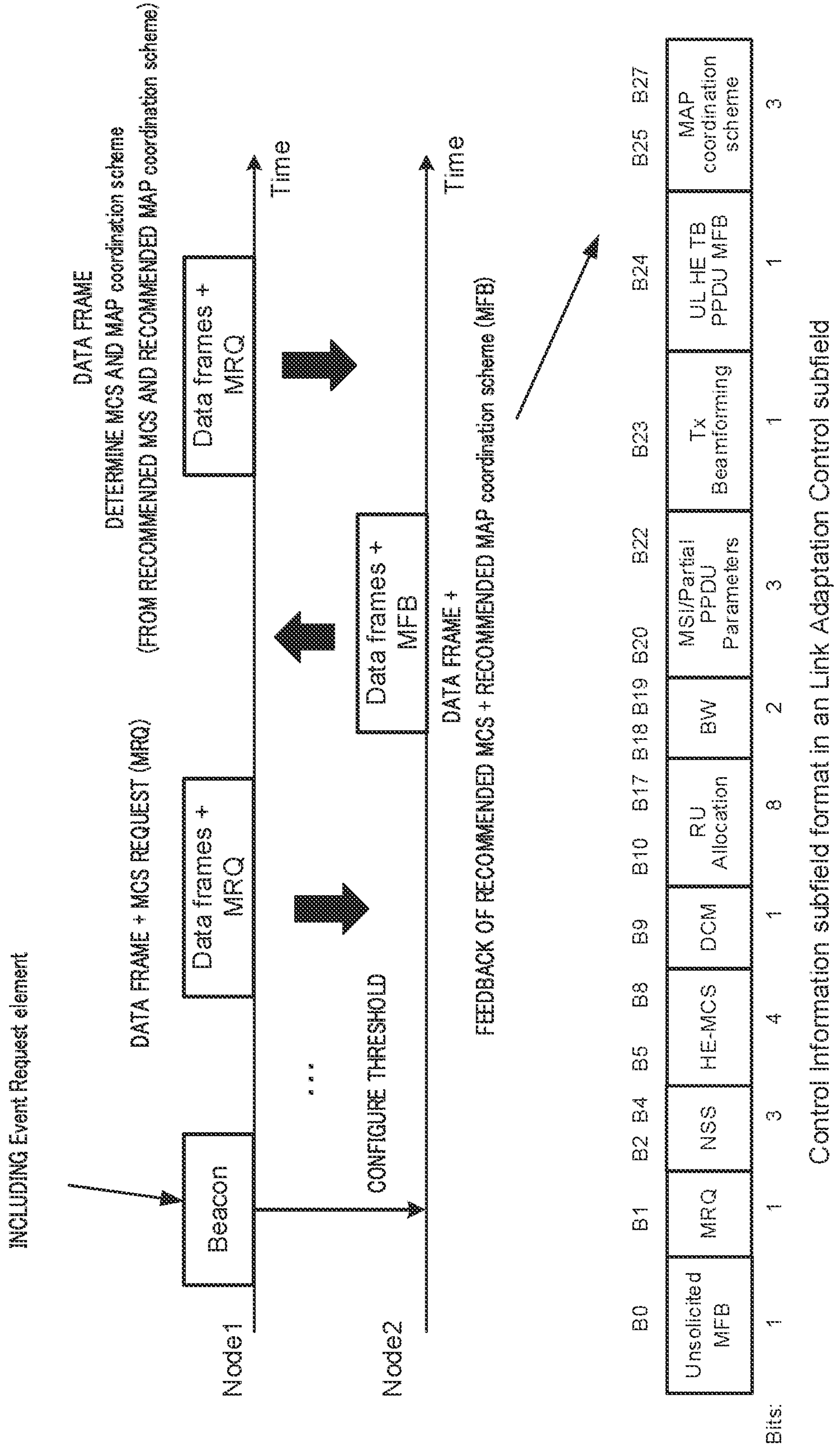
FIG. 19 illustrates exemplary operations of Link Adaptation according to Embodiment 6.

FIG. 19 illustrates exemplary operations of Link Adaptation according to Embodiment 6. The horizontal axis in FIG. 19 represents a time axis.

A Beacon frame includes an Event Request element. For example, the Event Request element may be the same as that described in Embodiment 1. For example, the Beacon frame may include "Subelement ID," "SNR Threshold." and "RSSI Threshold" as illustrated in FIG. 7A.

A determination threshold is indicated to each Node by the Event Request element included in the Beacon frame.

Note that FIG. 19 illustrates an example in which an Event Request element is included in a Beacon frame, but the Event Request Element may be included in an Event Request frame, MAP Action frame, Radio Measurement Request frames, or the like, and indicated as described in Embodiments 1 to 3.

Node 1 transmits a Modulation and Coding Scheme (MCS) Request (MRQ) to Node 2. In the example of FIG. 19, the MCS request is transmitted together with Data frames.

Node 2 transmits MCS Feedback (MFB) as a response to the MCS request. In FIG. 19, the MCS feedback (MFB) includes information on a recommended Modulation and Coding Scheme (MCS) and a recommended MAP coordination scheme.

In the exemplary Control Information subfield format in a Link Adaptation Control subfield illustrated in FIG. 19, the area of B25 to B27 includes information on a recommended MAP coordination scheme. Node 1 that has received Modulation and Coding Scheme (MCS) feedback including the information on the recommended MAP coordination scheme determines a MAP coordination scheme based on the information on the recommended MAP coordination scheme, and transmits data to Node 2 using the MAP coordination scheme.

As described above, in Embodiment 6, the MAP coordination scheme can be efficiently controlled by incorporating the report on the MAP coordination scheme into the function of Link Adaptation, which enables reduction in the information amount of feedback of measurement values and improvement in system throughput.

Other Embodiments

Note that, in each of the above-described embodiments, an exemplary configuration of each frame has been described, but the information to be indicated is not limited to the information described in the above embodiments, and for example, another information may be added or at least some pieces of the defined information may be deleted.

Further, the names of the frame, element, field, subfield, and the like in the above-described embodiments are merely examples, and the present disclosure is not limited to the above-described examples. For example, a name other than "Event Request element" may be given to the configuration of the Event Request element illustrated in FIG. 7A.

Further, the definitions of the frame, element, field, subfield, and the like in the above-described embodiments are merely examples, and the present disclosure is not limited to the above-described examples. For example, "Multi-AP Feedback" is defined as "222" in the Event Type in FIG. 7A, but a value other than "222" may be defined for "Multi-AP Feedback."

Further, the configurations of the frame, element, field, subfield, and the like in the above-described embodiments are merely examples, and the present disclosure is not limited to the above-described examples. For example, at least one element may be omitted in the above-described frame configuration, or an element not included in the above-described frame configuration may be included in the configuration.

Further, in each of the above-described embodiments, AP indicating coordinated communication and AP to which coordinated communication is indicated have been described by the term "Sharing AP" and "Shared AP," respectively, but the present disclosure is not limited thereto, and other terms may be used.

Further, although a description has been given based on the 11be format as a non-limiting example in each of the above-described embodiments, a format to which an embodiment of the present disclosure can be applied is not limited to the 11be format. An embodiment of the present disclosure may be applied to, for example, IEEE 802.11bd (Next Generation V2X (NGV)), which is a next generation standard from an on-vehicle standard of IEEE 802.11p.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include a radio frequency (RF) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may include a device such as a controller or a sensor which is coupled to a communication device performing a function of communication described in the present disclosure. For example, the communication apparatus may include a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A communication apparatus according to an embodiment of the present disclosure includes: control circuitry, which, in operation, determines a measurement value by measuring signals received from a plurality of other communication apparatuses, and generates feedback information on switching of coordinated communication based on the measurement value, and transmission circuitry, which, in operation, transmits the feedback information.

In the embodiment of the present disclosure, the control circuitry determines whether to switch the coordinated communication by comparing the measurement value and a threshold with each other.

In the embodiment of the present disclosure, the communication apparatus further includes reception circuitry, which, in operation, receives configuration information on the threshold.

In the embodiment of the present disclosure, the configuration information is included in an Event Request element, and the feedback information is included in an Event Report element.

In the embodiment of the present disclosure, the reception circuitry receives the configuration information included in a MAP Event element defined in a MAP Action frame, and the transmission circuitry transmits the feedback information included in a MAP Event element in a MAP Action frame.

In the embodiment of the present disclosure, the reception circuitry receives the configuration information included in an STA statistics request included in a Radio Measurement Request, and the transmission circuitry transmits the feedback information included in an STA statistics report included in a Radio Measurement Report.

In the embodiment of the present disclosure, the control circuitry generates the feedback information based on a plurality of the measurement values at a plurality of points in time.

In the embodiment of the present disclosure, the control circuitry determines whether to switch from a first coordinated communication scheme to a second coordinated communication scheme by comparing the measurement value and a first threshold with each other, and determines whether to switch from the second coordinated communication scheme to the first coordinated communication scheme by comparing the measurement value and a second threshold with each other, the second threshold being different from the first threshold.

In the embodiment of the present disclosure, the communication apparatus further including reception circuitry, which, in operation, receives indication information requesting the feedback information, in which the control circuitry generates the feedback information in response to the request.

In the embodiment of the present disclosure, the indication information is configured with a type, and the reception circuitry receives the indication information the type of which indicates a request for feedback information on switching of the coordinated communication.

In the embodiment of the present disclosure, the indication information is configured with a type, and the reception circuitry receives the indication information the type of which indicates a request for feedback information on measurement for the coordinated communication.

In the embodiment of the present disclosure, the transmission circuitry transmits the feedback information using any one of an NDP feedback report, a Data frame, and a control frame.

In the embodiment of the present disclosure, the feedback information is included in a parameter requested for link adaptation.

In a communication method according to an embodiment of the present disclosure, a communication apparatus determines a measurement value by measuring signals received from a plurality of other communication apparatuses, generates feedback information on switching of coordinated communication based on the measurement value, and transmits the feedback information.

The disclosure of Japanese Patent Application No. 2022-019611, filed on Feb. 10, 2022, including the specification, drawings and abstract, is incorporated herein by reference in its entirety.

INDUSTRIAL APPLICABILITY

An embodiment of the present disclosure is useful for radio communication systems.

REFERENCE SIGNS LIST

100 AP
101, 204 Controller
102 STA control-signal generator
103 AP control-signal generator
104, 203 Transmission signal generator
105, 201 Radio transceiver
106, 202 Reception signal demodulator/decoder
200 STA

The invention claimed is:

1. A communication apparatus, comprising:
control circuitry, which, in operation:
determines a measurement value by measuring signals received from a plurality of other communication apparatuses;
determines whether to switch a coordinated communication scheme based on the measurement value; and
generates feedback information on switching of coordinated communication indicating a recommended coordinated communication scheme using results of the determination of whether to switch the coordinated communication scheme; and
transmission circuitry, which, in operation, transmits the feedback information.

2. The communication apparatus according to claim 1, wherein
the control circuitry determines whether to switch the coordinated communication by comparing the measurement value and a threshold with each other.

3. The communication apparatus according to claim 2, comprising reception circuitry, which, in operation, receives configuration information on the threshold.

4. The communication apparatus according to claim 3, wherein
the configuration information is included in an Event Request element, and
the feedback information is included in an Event Report element.

5. The communication apparatus according to claim 3, wherein
the reception circuitry receives the configuration information included in a MAP Event element defined in a MAP Action frame, and
the transmission circuitry transmits the feedback information included in a MAP Event element in a MAP Action frame.

6. The communication apparatus according to claim 3, wherein
the reception circuitry receives the configuration information included in an STA statistics request included in a Radio Measurement Request, and
the transmission circuitry transmits the feedback information included in an STA statistics report included in a Radio Measurement Report.

7. The communication apparatus according to claim 2, wherein the control circuitry determines whether to switch from a first coordinated communication scheme by comparing the measurement value and a first threshold with each other, and determines whether to switch from a second coordinated communication scheme by comparing the measurement value and a second threshold with each other, the second threshold being different from the first threshold.

8. The communication apparatus according to claim 1, wherein the control circuitry generates the feedback information based on a plurality of the measurement values at a plurality of points in time.

9. The communication apparatus according to claim 1, further comprising reception circuitry, which, in operation, receives indication information requesting the feedback information, wherein the control circuitry generates the feedback information in response to the request.

10. The communication apparatus according to claim 9, wherein the indication information is configured with a type, and the reception circuitry receives the indication information the type of which indicates a request for feedback information on switching of the coordinated communication.

11. The communication apparatus according to claim 9, wherein the indication information is configured with a type, and the reception circuitry receives the indication information the type of which indicates a request for feedback information on measurement for the coordinated communication.

12. The communication apparatus according to claim 9, wherein the transmission circuitry transmits the feedback information using any one of an NDP feedback report, a Data frame, and a control frame.

13. The communication apparatus according to claim 1, wherein the feedback information is included in a parameter requested for link adaptation.

14. The communication apparatus of claim 1, wherein, in response to a determination not to switch the coordinated communication scheme, the transmission circuitry refrains from transmitting the feedback information.

15. The communication apparatus of claim 1, wherein, the feedback information does not include the measurement value used to determine whether to switch the coordinated communication scheme.

16. A communication method, comprising:

determining, by a communication apparatus, a measurement value by measuring signals received from a plurality of other communication apparatuses;

determining, by the communication apparatus, whether to switch a coordinated communication scheme based on the measurement value;

generating, by the communication apparatus, feedback information on switching of coordinated communication indicating a recommended coordinated communication scheme using results of the determination of whether to switch the coordinated communication scheme; and transmitting, by the communication apparatus, the feedback information.

* * * * *